(12) United States Patent
Best

(10) Patent No.: US 7,278,031 B1
(45) Date of Patent: Oct. 2, 2007

(54) SECURE DISTRIBUTION OF PORTABLE GAME SOFTWARE

(76) Inventor: Robert M. Best, 758 Kapahulu Ave., Box 610, Honolulu, HI (US) 96816

( * ) Notice: Subject to any disclaimer, the term of this patent is extended or adjusted under 35 U.S.C. 154(b) by 798 days.

(21) Appl. No.: 10/427,793

(22) Filed: Apr. 30, 2003

Related U.S. Application Data

(63) Continuation-in-part of application No. 10/135,319, filed on Apr. 29, 2002, now abandoned, and a continuation-in-part of application No. 09/853,487, filed on May 10, 2001, now Pat. No. 6,966,837.

(51) Int. Cl.
*H04L 9/00* (2006.01)
(52) U.S. Cl. ............................ 713/193; 726/2; 713/191
(58) Field of Classification Search .................... 713/1, 713/2, 188, 194, 191, 193; 380/200, 201, 380/255, 277; 726/2
See application file for complete search history.

(56) References Cited

U.S. PATENT DOCUMENTS

| | | | |
|---|---|---|---|
| 4,218,582 A | 8/1980 | Hellman et al. | |
| 4,278,837 A | 7/1981 | Best | |
| 4,405,829 A | 9/1983 | Rivest et al. | |
| 4,433,207 A | 2/1984 | Best | |
| 4,658,093 A | 4/1987 | Hellman | |
| 4,670,857 A | 6/1987 | Rackman | |
| 4,677,604 A | 6/1987 | Selby et al. | |
| 4,694,412 A | 9/1987 | Domenik et al. | |
| 4,803,683 A * | 2/1989 | Mori et al. | 714/31 |
| 4,817,140 A | 3/1989 | Chandra et al. | |
| 5,134,391 A | 7/1992 | Okada | |
| 5,184,830 A | 2/1993 | Okada et al. | |
| 5,224,166 A | 6/1993 | Hartman, Jr. | |
| 5,457,668 A | 10/1995 | Hibino et al. | |
| 5,550,999 A | 8/1996 | Nagano et al. | |

(Continued)

FOREIGN PATENT DOCUMENTS

GB 2365361 A 2/2002

(Continued)

OTHER PUBLICATIONS

Data Encryption Standard (DES); FIPS PUB 46-3, Reaffirmed Oct. 25, 1999; U.S. Department of Commerce/National Institute of Standards and Technology.

(Continued)

*Primary Examiner*—Kim Vu
*Assistant Examiner*—Joseph Pan
(74) *Attorney, Agent, or Firm*—Graybeal Jackson Haley, LLP

(57) ABSTRACT

Game software for use in video game systems can be downloaded from Internet servers to game consoles in encrypted form to protect the software from being copied by software pirates. A small but essential part of the game software can be encrypted for use with a larger amount software that is not encrypted. The encrypted portion is downloaded into a secure cryptoprocessor preferably in a memory cartridge that plugs into a game system. This cryptoprocessor decrypts the downloaded software, stores it in on-chip EEPROM and then executes it, all in the same cryptoprocessor. The non-encrypted software is processed in the game system by a conventional processor which depends on data generated by program instructions decrypted and executed in the secure cryptoprocessor.

20 Claims, 20 Drawing Sheets

U.S. PATENT DOCUMENTS

| | | | |
|---|---|---|---|
| 5,577,121 | A | 11/1996 | Davis et al. |
| RE035,839 | E | 7/1998 | Asai et al. |
| 5,778,421 | A | 7/1998 | Nagano et al. |
| 5,809,140 | A | 9/1998 | Rubin |
| 5,826,011 | A | 10/1998 | Chou et al. |
| 5,850,230 | A | 12/1998 | San et al. |
| 5,881,038 | A | 3/1999 | Oshima et al. |
| 5,937,066 | A | 8/1999 | Gennaro et al. |
| 6,022,274 | A | 2/2000 | Takeda et al. |
| 6,034,937 | A | 3/2000 | Kumagai |
| 6,071,191 | A | 6/2000 | Takeda et al. |
| 6,081,785 | A | 6/2000 | Oshima et al. |
| 6,132,315 | A | 10/2000 | Miyamoto et al. |
| 6,139,433 | A | 10/2000 | Miyamoto et al. |
| 6,175,629 | B1 | 1/2001 | Gotoh et al. |
| 6,190,257 | B1 | 2/2001 | Takeda et al. |
| 6,256,391 | B1 | 7/2001 | Ishiguro et al. |
| 6,339,815 | B1 | 1/2002 | Feng et al. |
| 6,369,827 | B1 | 4/2002 | Pan et al. |
| 6,400,996 | B1 * | 6/2002 | Hoffberg et al. ............... 700/83 |
| 6,468,160 | B2 | 10/2002 | Eliott |
| 6,544,126 | B2 * | 4/2003 | Sawano et al. ............... 463/42 |
| 6,669,564 | B1 | 12/2003 | Young et al. |
| 6,694,436 | B1 | 2/2004 | Audebert |
| 6,785,843 | B1 * | 8/2004 | McRae et al. ................ 714/23 |
| 6,996,817 | B2 | 2/2006 | Birum et al. |
| 2001/0029205 | A1 * | 10/2001 | Taho et al. .................... 463/43 |
| 2001/0039212 | A1 | 11/2001 | Sawano et al. |
| 2002/0026424 | A1 | 2/2002 | Akashi |
| 2002/0028710 | A1 | 3/2002 | Ishihara et al. |
| 2002/0073316 | A1 | 6/2002 | Collins et al. |
| 2002/0141577 | A1 | 10/2002 | Ripley et al. |
| 2003/0048718 | A1 | 3/2003 | Watanabe et al. |
| 2003/0050116 | A1 | 3/2003 | Chen |
| 2003/0140241 | A1 | 7/2003 | Englund et al. |
| 2006/0236090 | A1 | 10/2006 | Birum et al. |

FOREIGN PATENT DOCUMENTS

GB         2366025 A       2/2002

OTHER PUBLICATIONS

R. Elbaz et al., Hardware Engines for Bus Encrption: a Survey of Existing Techniques (c) 2005 IEEE, [retrieved on Oct. 26, 2006]. [online] 6 pages. Retrieved from the Internet: <URL:http://data.eda-online.co.uk/proceedings/papers/2005/date05/df_filed/02d_1.pdf>.

* cited by examiner

EEPROM 295

| |
|---|
| start up instructions |
| instructions for generating game data representating a player object |
| instructions for generating game data representating a non-player object |
| instructions for writing game data into SRAM 239 for use by processor 50 |
| instructions for processing input control data from manual control devices |
| instructions for transferring data to and from another game system |
| instructions for determining effects of object collisions and manual controls |
| instructions for detecting object collisions, achieving goals, and keeping score |
| object model data, joint articulation data, polygon data |
| object texture data, background locations, and location indentifying data |
| data defining movements of objects |
| other game programs and graphics data |

Fig. 13

Fig. 18 in console 42  90

| |
|---|
| program for loading RAM 90 with program and data from disk 43 |
| program for generating image of 3D world |
| program for generating image of animated character |
| program for generating image of moving object |
| program for animating a character |
| data for animated characters in 3D world |
| data for objects in 3D world |
| data for music and sound effects |
| data for character descriptions (polygons, textures, etc) |
| data for terrain descriptions (polygons, textures, etc) |
| data for maps, word menus, etc. |

Fig. 18a in crypto processor 303  313

| |
|---|
| instructions for authenticating digital data from disk 43 |
| instructions for authenticating physical features of disk 43 |
| instructions for encrypting/decrypting a block of data |
| instructions for processing key selection and find bits of a key |
| instructions for counting and limiting the number of game copies |
| instructions for controlling positions of read head servos |
| instructions for sending data to and from cartridge processor 126 |
| instructions for locating key bits in key table 110 among decoy bits |

SECURE DISTRIBUTION OF PORTABLE GAME SOFTWARE

RELATED APPLICATIONS

This is a continuation-in-part of U.S. patent application Ser. No. 09/853,487 filed May 10, 2001 now U.S. Pat. No. 6,966,837, and also a continuation-in-part of U.S. patent application Ser. No. 10/135,319 filed Apr. 29, 2002 abandoned. These applications in their entirety are incorporated by reference herein.

BACKGROUND OF THE INVENTION

1. Field of the Invention

This invention relates generally to electronic game systems and more particularly to game software recorded in copy protected form.

2. Description of the Prior Art

Portable game systems that generate player controlled objects in simulated worlds for display on an LCD screen are well known and are described in U.S. Pat. No. 6,369,827. It is also well known to store game program instructions and graphics data in digital memory cartridges that plug into such portable game systems. Even if such digital memory cartridges include a trademark and copyright notice as described in U.S. Pat. No. 5,184,830, software pirates disregard such notices. Game software in executable form is easily copied and is often sold by software pirates in counterfeit cartridges and disks and is distributed freely on the Internet. It is also known to protect programs by securely storing them in a digital memory in the same processor chip that executes the program instructions as described in U.S. Pat. No. 6,339,815. It is also known to include microprocessors in portable game cartridges as described in US patent applications 2002/0028710 and 2003/0050116. Crypto microprocessors that execute encrypted programs using bus encryption are also disclosed in my U.S. Pat. No. 4,278,837.

Software for game systems has been distributed on laser-readable optical disks for use in console game systems. Game software is typically pressed into optical disks during disk fabrication. Then encrypted data is typically burned into a ring-shaped area of the disk known as the Burst Cutting Area (BCA) also known as PCA, which consists of a unique circular series of variable-spaced bars that are burned, melted, or heated with a medium power laser beam into each disk after the disk is pressed by the manufacturer. This heating process permanently alters reflectivity of bar-shaped areas in a reflective layer in the disk. The word "burned" is used herein to encompass various methods for placing a substantially unique bar code onto each disk, even though the reflective layer(s) are usually not burned through but merely darkened. Reflectivity of the burned bars is distinguished from the surrounding unburned area which may overlap the pressed pit area of the disk. More than a hundred patents have been issued for optical disks, BCA, and related technology, such U.S. Pat. Nos. 6,081,785 and 6,175,629.

Various physical features of the pressed pits and burned barcodes may be recorded in optical disks for authentication by disk controllers, as described in US patent application 2003/0048718. These physical features may include the quantity, relative locations, shape, size, and/or reflectance of pressed pits and/or laser-burned bar codes.

Game data on optical disks has been authenticated by disk drive controller chips, but such authenticating processors in consoles are physically separated from the processors in portable game systems that execute game programs from cartridges. This creates a problem of securely downloading software from the Internet or from optical disks in consoles to portable game system cartridges.

There are various ways that video games can be downloaded into a game system from an Internet server or over a telephone line. For simple video games, all of the software, including programs and data, can be downloaded from a server and stored into a nonvolatile data memory cartridge in a user's game system.

Piracy of portable game software (programs and data) is similar to piracy of music software. When digitized music is read from a data storage medium or decrypted so that it can be converted to analog sounds that can be heard, the digitized music is easy for pirates to copy. But there is one major difference between music and game software. Game programs do not have to be heard or seen by their users and hence game programs do not have to be executed in easily accessible portable game system processors.

In the present invention, encrypted game programs can be distributed in encrypted form on optical disks and on Internet servers, downloaded in encrypted form, and decrypted, stored, and executed in integrated crypto processors in game memory cartridges to generate game data, without the decrypted game programs being accessible outside of the crypto processors.

SUMMARY OF THE INVENTION

It is a primary objective of the present invention to provide copy protection for game software that is distributed on Internet servers and used in portable game systems. It is another objective of the present invention that modification of portable game systems in which the software cartridge is used should not be required for the protection to be effective. It is another objective of this invention that this protection be provided at low cost.

The preferred embodiment of this invention is an electronic game system for portable game software downloaded in encrypted form from Internet servers for execution in cryptographic processors housed in special memory cartridges that plug into portable game systems. Game users may then play the games in the portable game systems without any connection to a disk reader or the Internet. To such game players, the special cartridge would resemble an ordinary memory cartridge that can be loaded and reloaded with game software from a video game console unit or from an adapter attached to a video game console unit that downloads game software.

ADVANTAGES

By distributing encrypted game software on the Internet, proprietary game software can be delivered securely to users without the additional cost of dedicated cartridges or dialup activation. Each user can reload a cryptographic memory cartridge with separately priced game software and therefore the total cost to the vendor will be less than using dedicated ROM cartridges for all of the games.

BRIEF DESCRIPTION OF THE DRAWINGS

FIG. 13 is an example of a memory map of EEPROM 295.

FIG. 18 is an example of a memory map illustrating software stored in RAM 90 in console 42.

FIG. 18a is an example of a memory map illustrating software stored in ROM 313 in crypto processor 303.

DETAILED DESCRIPTION OF EXEMPLARY EMBODIMENT

Figure 1:
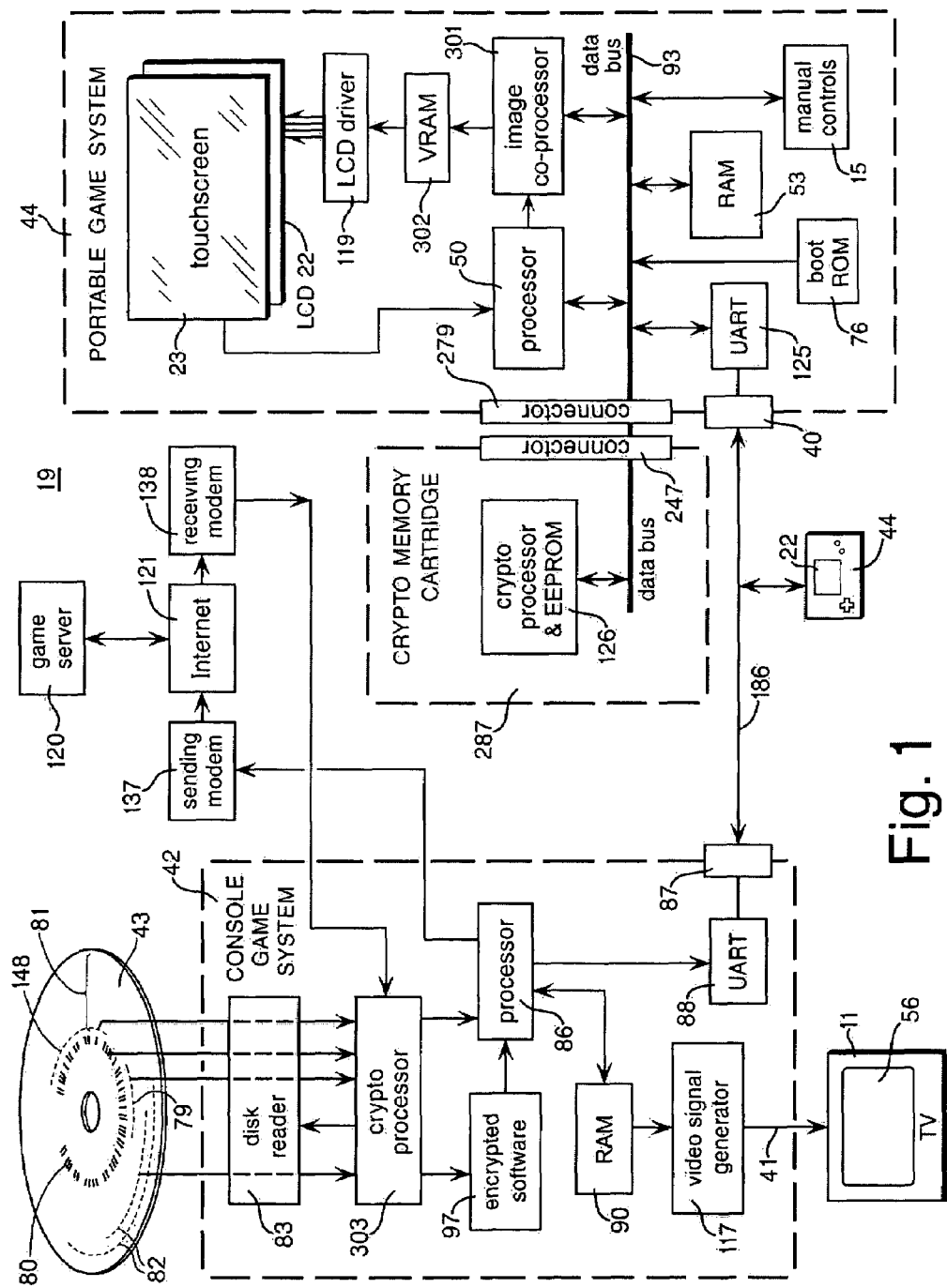
FIG. 1 is a block diagram of one embodiment that can be used with consoles and portable game systems.

FIG. 1 illustrates a preferred embodiment of a video game system 19 that comprises console game system 42, crypto memory cartridge 287, portable game system 44, and Internet 121 access to server 120. The objective is to securely download encrypted software 97 (programs and data) from game software server 120 to crypto processor 126 in cartridge 287 by way of crypto processor 303 as described below with reference to FIGS. 5 and 6. Cryptoprocessor 126 (detailed in FIGS. 6, 7, and 8) decrypts the downloaded software and stores the decrypted software in writable nonvolatile memory 295 which is on the same chip as processor core 134 (FIGS. 7 and 8) in cryptoprocessor 126 which executes the decrypted programs while cartridge 287 is inserted into portable game system 44.

Figure 14:
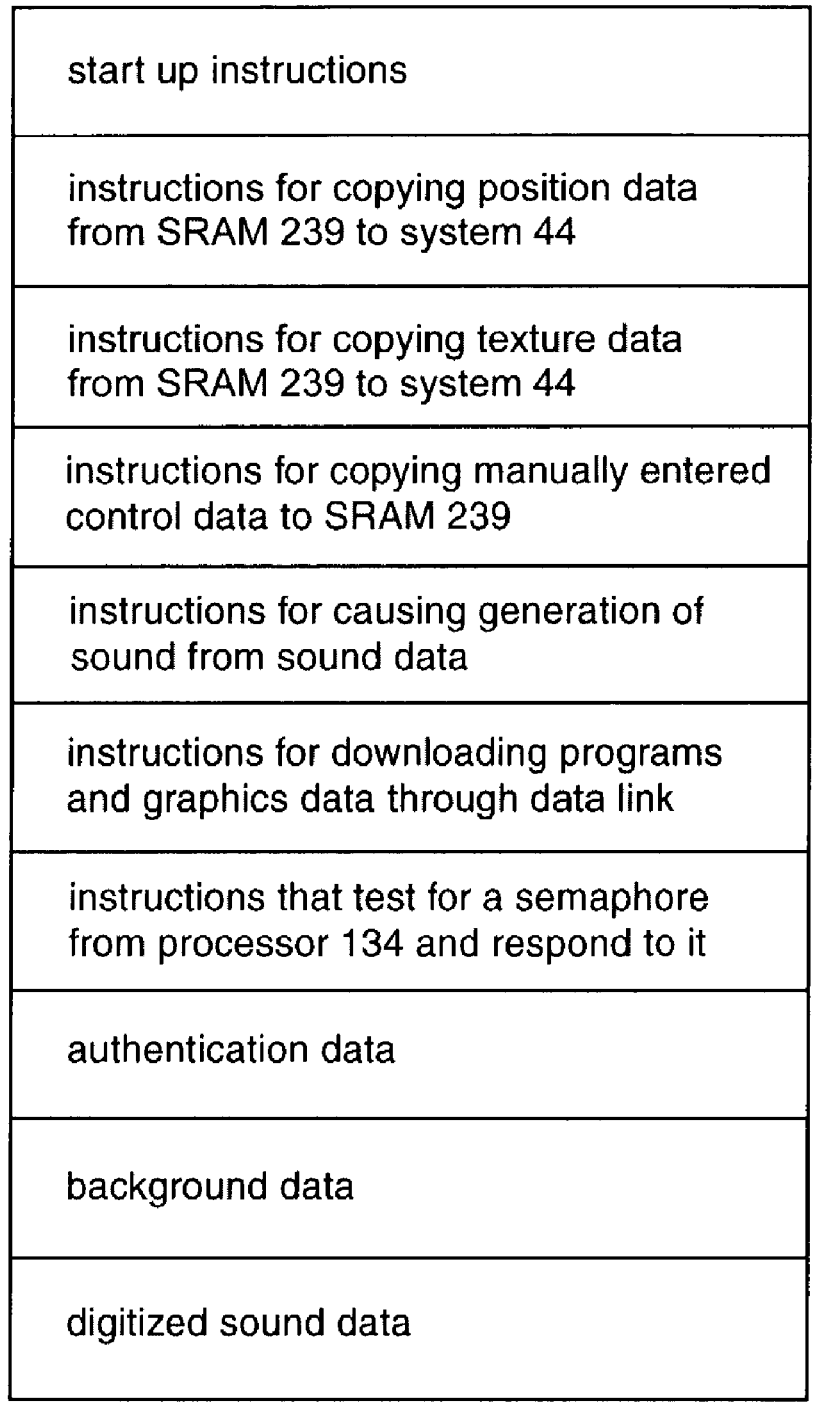
FIG. 14 is an example of a memory map of ROM 89 programs executed in processor 50.

Each downloaded encrypted program for use in portable system 44 is encrypted differently and can be used only with the cryptoprocessor 126 into which it was downloaded so that one user's downloaded program cannot be copied for use in another user's cartridge 287 that has a different cryptoprocessor. However, after encrypted software 97 is downloaded from server 120 into console 42 and further downloaded by processor 86 into cryptoprocessor 126 in cartridge 287, the downloaded software may be used in other portable systems 44 with corresponding non-encrypted software 96 (FIG. 2) downloaded into the same cartridge 287 for execution in processor 50 (FIG. 14). Only a small portion of the total game program instructions for each title need be decrypted and executed in crypto processor 126 and 303.

Encrypted software may also be downloaded from game software server 120 through Internet 121 to console 42 and executed in crypto processor 303 in console 42 as described below with reference to FIG. 2.

Game software in RAM 90 in console 42 consists of programs and data read from disk 43 and from Internet server 120. These programs execute in processor 86 which may include one or more coprocessors. Programs executed in processor 86 process data from RAM 90 and generate picture data from which video signal generator 117 generates video signals for display on TV 11 or other video display such as LCD flat panel displays. Processor 86 may also be connected to one or more handheld game units 44 by cables 186 or wireless equivalent (not shown in FIG. 1) such as infrared, ultrasonic, RF waves, or other data communicating forms of energy.

When a user requests download of game software, processor 86 (FIG. 1) or security processor 84 (FIG. 2) sends a request through modem 137 and Internet 121 to game software server 120 which is described below with reference to FIG. 9.

When game software is downloaded from game server 120, an Internet or other data transmission connection 121 is temporarily established between server 120 and a modem located in console 42 or attached to console 42. For clarity in FIG. 1, this modem is illustrated as a sending (modulating) modem 137 and a receiving (demodulating) modem 138 to show data flow.

Video game system 19 combines the disk authenticating functions of disk reader 83 (FIG. 1) or controller 84 (FIG. 2) with the crypto functions of crypto processor 303 in console 42.

Console 42 downloads encrypted software into cartridge 287 by way of data link 186 connecting serial ports 87 and 40. In this embodiment, cartridge 287 is plugged into connector 279 in portable game system 44. Encrypted software in RAM 97 and encrypted data from crypto processor 303 are transferred serially through data link 186 to processor 50 which further transfers the data to EEPROM 295 (FIG. 6) in cartridge 287. The serial data link may be a cable 186 as shown in FIG. 1, or a wireless equivalent.

An additional ROM 89 (FIG. 7) in cartridge 287 may store non-encrypted game programs that execute in processor 50 in portable game system 44 in cooperation with encrypted programs executed in cartridge 287. To the user, cartridge 287 will seem no different than an ordinary ROM cartridge that can be repeatedly reloaded with newly downloaded game software.

Portable game system 44 has a processor 50 that, when power is turned on, initially executes a small program in boot ROM 76 to authenticate a connected memory cartridge 287 containing crypto processor 126. The boot program in ROM 76 verifies that predetermined authenticating trademark data is present.

In the FIG. 1 embodiment, portable game system 44 includes touchscreen 23 positioned on LCD panel 22 for manual operation as further described below with reference to FIGS. 16, 17, and 19.

Figure 2:
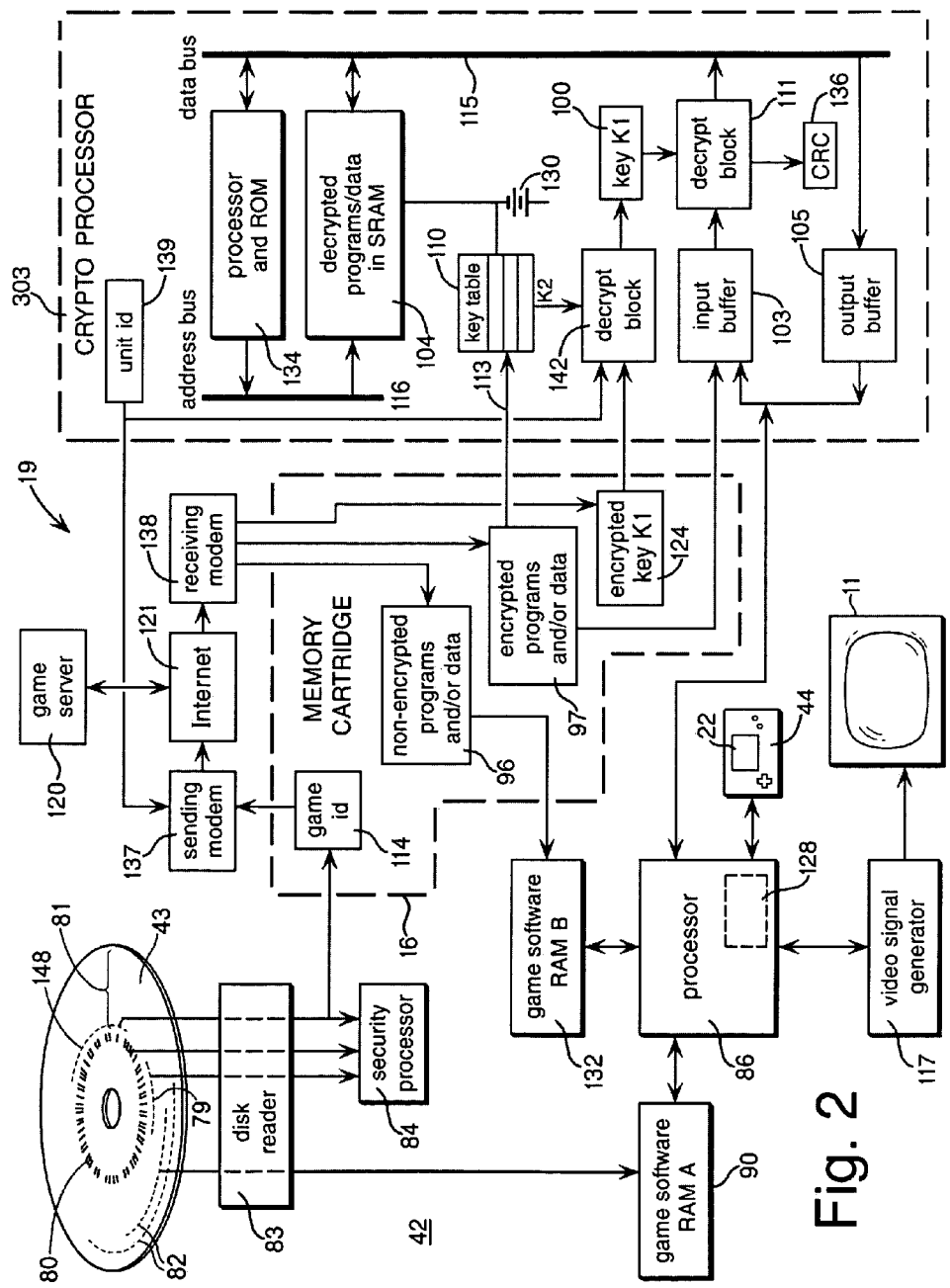
FIG. 2 is a block diagram of the data flow used in FIG. 1.

FIG. 2 illustrates an embodiment of a video game system 19 that includes crypto processor 303, memory cartridge 16, Internet 121, optical disk 43, TV 11, portable game system 44, and components housed in video game console unit 42. For clarity, the housing of unit 42 is not shown.

Game console 42 in FIG. 2 downloads encrypted game programs 97 from Internet game server 120 for decryption and execution in cryptoprocessor 303 in game console 42. These encrypted game programs 97 may be used with non-encrypted software 96 that may also be downloaded from server 120 and/or used with non-encrypted software 90 that is read from optical disk 43. Each downloaded encrypted program 97 for execution in cryptoprocessor 303 is encrypted differently in server 120 (FIG. 9) and can be used only in the cryptoprocessor 303 in the system 42 that requested the download, so that one user's downloaded program 97 cannot be copied for use in another user's cryptoprocessor.

Console 42 typically contains disk reader 83 which reads digital information from optical disks such as disk 43 in which the digital information is molded and burned. Disk reader 83 reads this digital information from two areas of disk 43: from area 81 and from area 80 which may overlap. In area 81 the digital information is represented as a track or tracks 82, 79, 148, and other tracks of microscopic pits that are pressed or molded into each disk during disk fabrication. Digital information is later burned with a laser as a unique bar code in area 80 of each disk 43. Area 81 includes video game programs and data for processing in console processor 86 and may also include encrypted game programs and data to be downloaded to crypto processor 126 through crypto processor 303.

Console 42 also contains a security processor 84 that authenticates disk 43 by checking for consistency between pressed pit data 79 and bar code data 80 of disk 43. This authentication method is described in detail in U.S. Pat. No. 6,175,629.

Disk reader 83 reads video game programs and data from tracks 82 into RAM 90. Disk reader 83 may also read game identifier 114 from lead-in track 148. Tracks 82 and 148 are typically pressed into disk 43 during disk fabrication. Disk reader 83 may also read encrypted control record 94 (FIG. 9) from bar code 80. Each bar code 80 includes an encrypted control record which includes a unique serial number 101 for each disk (see FIGS. 9 and 10). Serial number 101 is block encrypted together with RSA id signature 144 (FIG. 10) for authentication by process 102 (FIG. 9).

Game identifier 114 is read from disk 43 and encrypted control record 94 is read from disk bar code 80 and are transmitted to game server 120. Game identifier 114 selects game software for downloading and encrypted control record 94 is decrypted in the server 120 to give each game customer a unique identification serial number 101 (see description below with reference to FIG. 9). Crypto processor 303 may also include a unique unit identifier 139 which is transmitted to game server 120 to identify the customer's game system 42 or cartridge 287 (FIG. 3) and to insure that each encrypted program 97 is an authorized download.

In the preferred embodiment, server 120 downloads at least four kinds of game software: non-encrypted programs and/or data 96, encrypted programs and/or data 97, key selection byte 113 and encrypted key 124 (K1). These four kinds of downloaded software, and game identifier 114, may be stored in removable nonvolatile read/write data memory cartridge 16 or harddisk drive (not shown). Cartridge 16 is preferred over an internal harddisk so that users may carry disk 43 and cartridge 16 together to another console unit 42 without losing the ability to play downloaded games in different game systems.

Non-encrypted downloaded software 96 is copied into RAM 132 (RAM B) for execution and/or processing by processor 86 for additional levels and other enhancements. RAM 90 and RAM 132 may be different parts of the same RAM memory, but are shown separately in FIG. 2 for clarity. Download of non-encrypted programs from console 42 to a portable game system for execution in processor 50 is described below with reference to FIG. 15.

Encrypted software 97 is also downloaded from server 120 for decryption in block 111 and execution in processor core 134 to provide essential but secret functions to generate data for software in RAM 90 or 132 to process in processor 86. By keeping secret a small but essential part of the software, protection against illegal software copying is provided for all of the game software. For example, digital links between software in RAM 132 and RAM 90 would typically be required. If these links are in RAM 132 or RAM 90, they are at risk of being illegally copied. But if these digital links are never stored in RAM 132 or 90 in decrypted form, but instead are stored in physically protected SRAM 104 in cryptoprocessor 303, the links cannot be copied.

If a small program is decrypted in block decryption box 111 in crypto processor 303 and stored in SRAM 104 and executed in processor core 134, this small program may provide a trade-secret method of character movement, character intelligence, special sound generation, or other game element that is difficult to program and therefore may provide a competitive advantage if securely executed in crypto processor 303, rather than in processor 86.

Crypto processor 303, RAM 104, buses 115 and 116, and other components in crypto processor 303 are integrated into one application-specific circuit that is physically protected as described in my bus-encryption patent U.S. Pat. No. 4,278,837. Secret programs, data, and keys are preferably stored in volatile static RAM powered by electric battery or cell 130. Attempts to physically probe, scan, or peel the chip should result in loss of voltage to RAM 104 and key table 110, which should result in destruction of all secret data in crypto processor 303.

Figure 9:
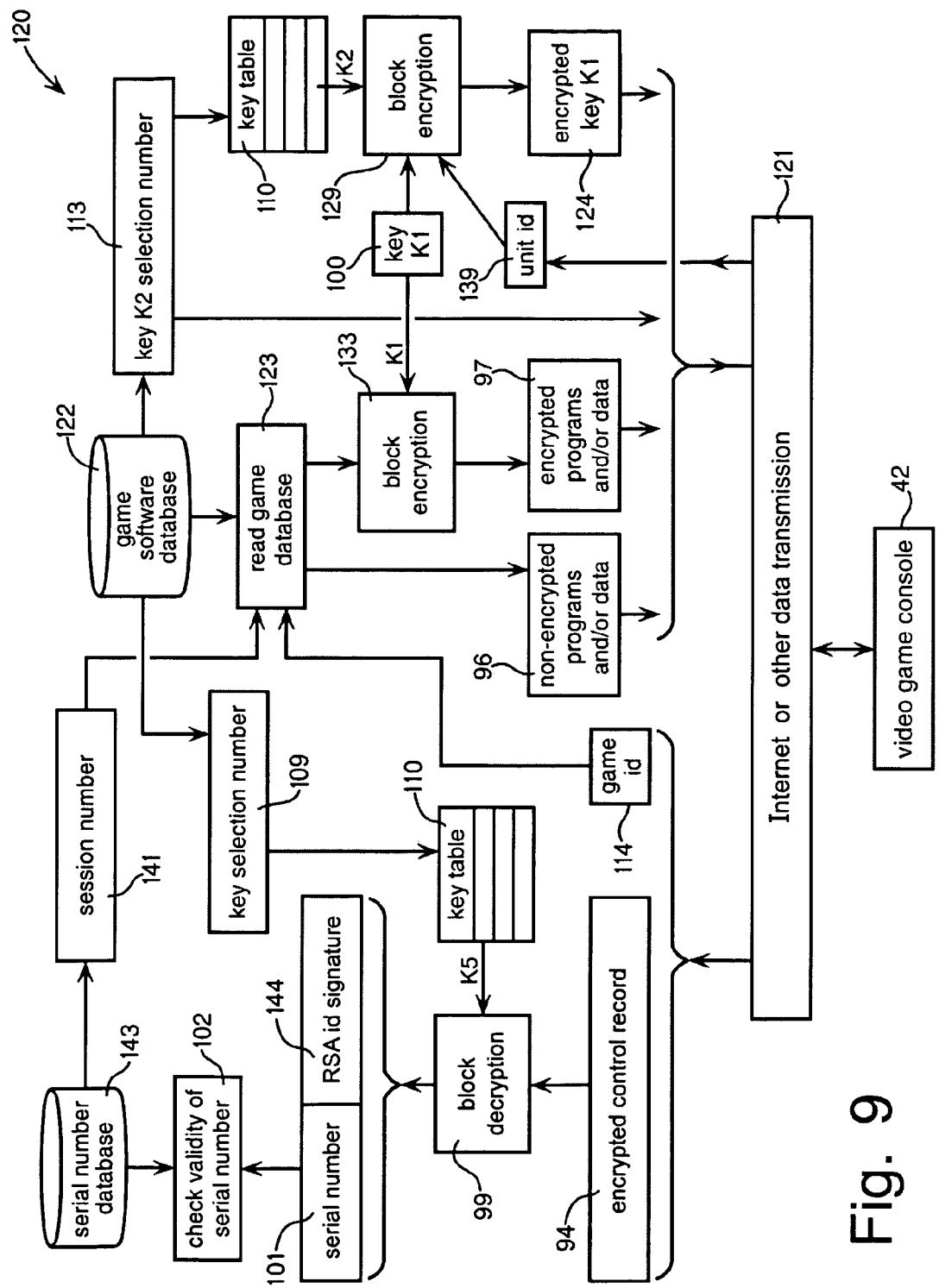
FIG. 9 is a block diagram of Internet game server 120.

Briefly referring to FIG. 9, game software 97 is encrypted in server 120 using block encryption method 133 such as DES or a similar Feistel encryption method under control of a secret session key 100 (key K1) which is a random number generated by server 120. Key K1 is then encrypted to produce encrypted key 124 (encrypted key K1) using a block encryption method 129 (which may be the same or similar to 133 and 99) under control of secret key K2 selected from secret key table 110 by a one-byte key selection number 113. Key selection number 113, and encrypted key 124 (encrypted key K1) are downloaded, along with encrypted software 97, and non-encrypted software 96 to game console 42.

With reference to FIG. 2, each crypto processor 303 has the same table 110 of secret keys mentioned above with reference to FIG. 9. Key selection number 113, hidden somewhere in encrypted software 97, selects key K2 from key table 110. Key K2 then controls block decryption 142 to decrypt encrypted key 124 (encrypted key K1) to produce plain session key K1 in register 100. Key K1 then controls block decryption 11 of encrypted software 97 which is read from memory cartridge 16 by crypto processor 303, one block at a time, into input buffer 103, to produce decrypted blocks on internal data bus 115. After performing cyclic redundancy check (CRC) 136 on each decrypted block, crypto processor 303 stores each block of decrypted program and data into battery-powered SRAM 104.

Although it may be tempting to simplify crypto processor 303 by eliminating key table 110, this would result in one secret master key K2 that would be the same in every crypto processor 303. That would be excessively risky and is not recommended. The keys in key table 110 can be further disguised by mixing randomly located decoy bits among the key bits in table 110. If an intruder succeeded in penetrating the physical security of crypto processor 303 without loss of secret data in SRAM 104 and discovered the bit values in key table 110, the intruder would not be able to make use of those bits as key without also discovering the program instructions in SRAM 104 and learning where to remove the decoy bits from key K2 read from table 110.

After decrypted programs and data are stored in SRAM 104, processor 134 executes the programs in SRAM 104 which communicate with processor 86 by a series of digital semaphores in input buffer 103 and output buffer 105. Using semaphores, perhaps encrypted, avoids the possibility of an intruder addressing data in SRAM 104. Semaphores are described below with reference to FIG. 12. Internal address bus 116 and internal data bus 155 should not be accessible, either as input or output, from outside of crypto processor 303. Data in RAM 132 and/or RAM 90 needed by processor core 134 is indirectly passed by way of processor 86 and buffer 103.

Figure 3:
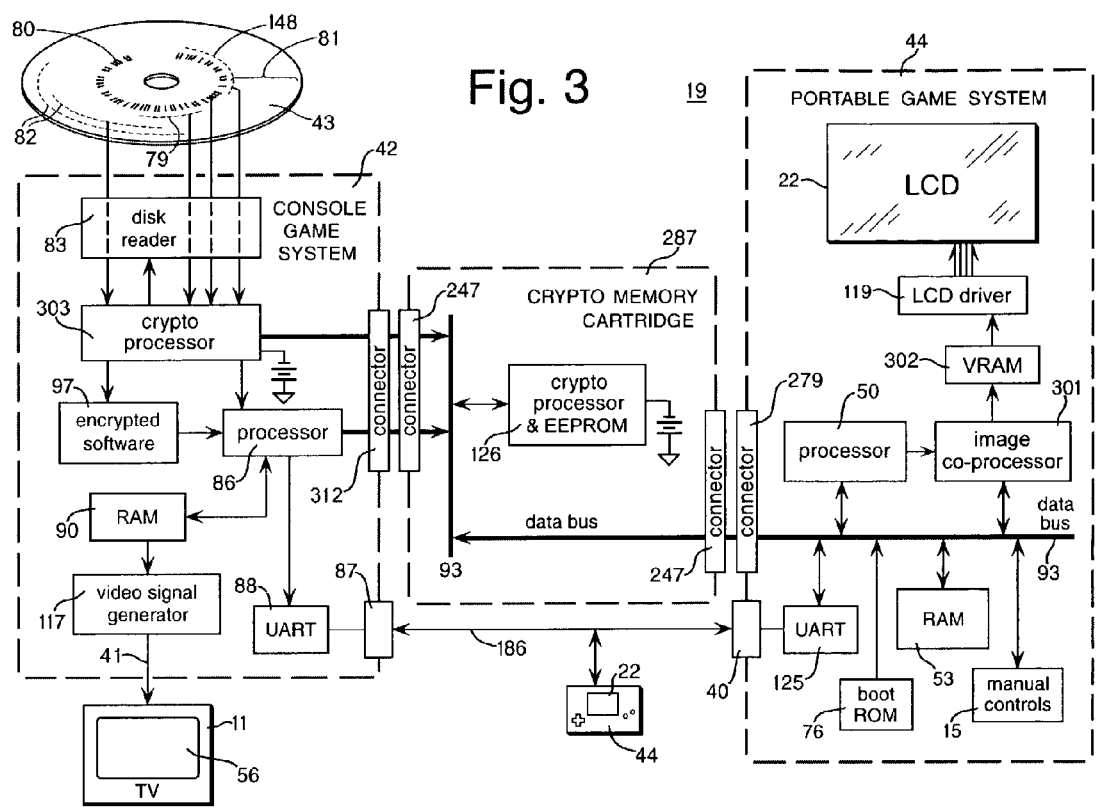
FIG. 3 is a block diagram of one embodiment in which the crypto cartridge plugs into the console and the portable.

FIG. 3 illustrates a second preferred embodiment of video game system 19 that combines the disk authenticating functions of disk controller 84 (FIG. 1) with the crypto functions of crypto processor 303 in console 42. Cartridge 287 may have two multiple-pin connectors, one for contacting connector 312 in console 42 and another connector for contacting connector 279 in portable game system 44. A physical interlock (not shown) can prevent simultaneous connections.

FIG. 3 also illustrates another method of downloading encrypted software into cartridge 287 by way of data link 186 connecting serial ports 87 and 40. In this embodiment, cartridge 287 is plugged into connector 279 in portable game system 44. Encrypted software in RAM 97 and encrypted data from crypto processor 303 are transferred serially through data link 186 to processor 50 which further transfers the data to EEPROM 295 (FIG. 6) in cartridge 287. The serial data link may be a cable 186 as shown in FIG. 3, or a wireless equivalent.

As illustrated in FIG. 3, an additional portable game system may receive software from disk 43 through console 42 and link cable 186 and execute programs in this software. Two or more such portable game systems may thus be operated by two or more human users. Alternatively one user may operate two or more portable game systems as display units. Each portable game system may receive different downloaded software from the same disk 43 or from different disks 43, so that one user may operate a portable game system as a controller and use another portable game system as an auxiliary display unit.

As described above with reference to FIG. 1, when game software is downloaded from game server 120, an Internet connection 121 is temporarily established between server 120 and a modem located in console 42 or attached to console 42. The downloaded software in console 42 may then be manually transferred in cartridge 287 to portable game system 44 as shown in FIG. 3.

In FIG. 3 crypto memory cartridge 287 is shown with two multiple-pin connectors 247, but in this example they are both the same connector that contacts adapter connector 312 during downloading, and contacts connector 279 in portable game system 44, for execution, but not simultaneously.

Figure 4:
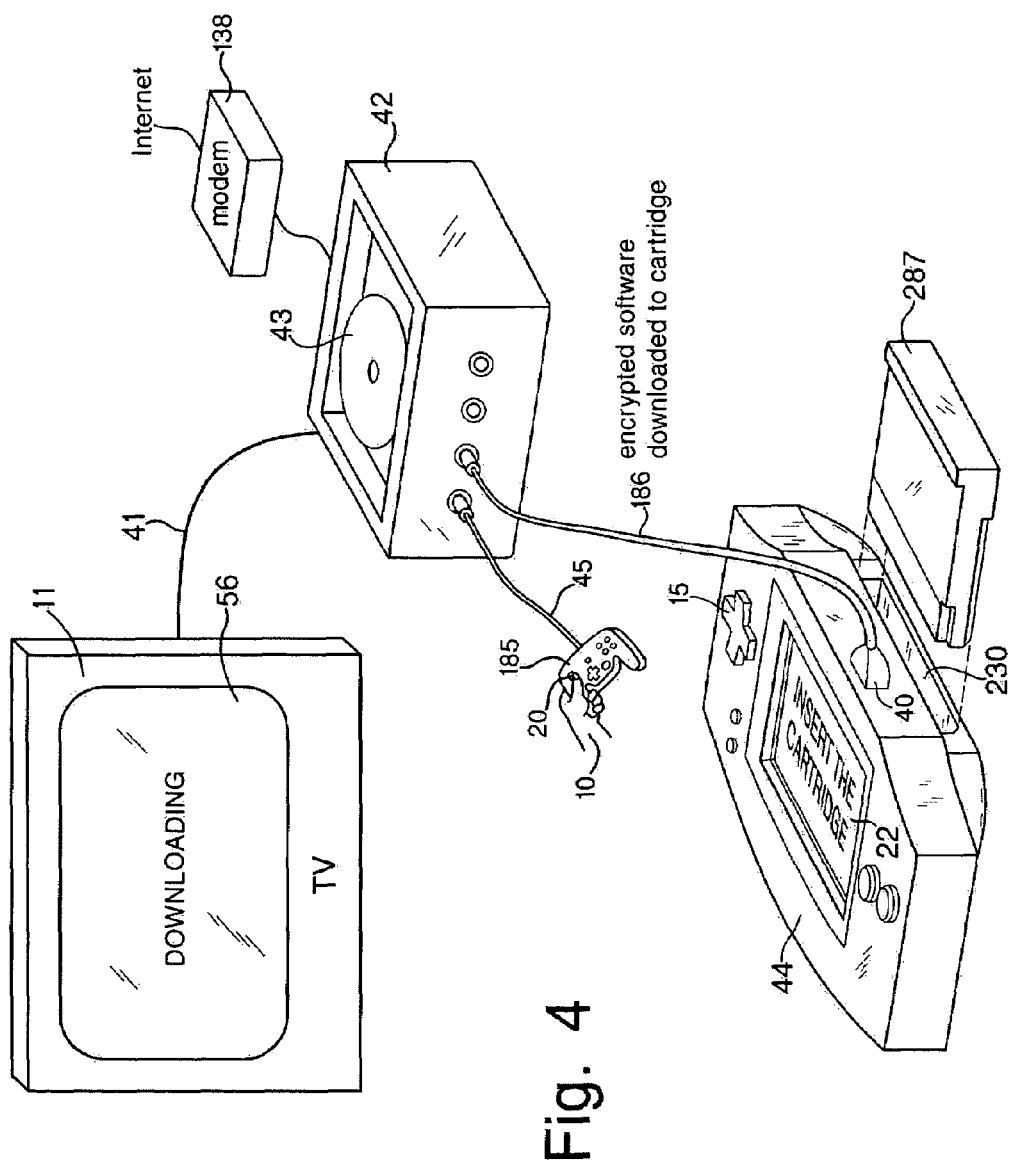
FIG. 4 is a perspective view of the system detailed in FIG. 1.

FIG. 4 illustrates downloading of software through the Internet and modem 138 to video game system 42 as described above with reference to FIG. 1. From system 42 the software is further downloaded to cartridge 287 in portable game system 44 through data link cable 186 or wireless equivalent. After downloading is complete, the portable game system 44 may be used as a controller in lieu of, or in addition to, controller 185 by executing programs download into cartridge 287. Or system 44 with cartridge 287 inserted may be disconnected from all other devices and cables and be operated independently.

In the examples described herein, block encryption and decryption used in processes 99, 111, 142, 147, 306, 307 operate on blocks of at least 64 bits under control of symmetrical keys of at least 64 bits and preferably 128 bits. Such block encryption may use a Feistel-class of block encryption methods such as the Data Encryption Standard (DES), AES, or similar methods, so that changing any one bit of plaintext affects all bits of ciphertext in an encrypted block, changing any one bit of ciphertext affects all bits of plaintext in a decrypted block, and changing any one bit of encrypted key affects all bits of plaintext in the block, without providing clues that would lead to discovery of the bit values of the secret key through chosen ciphertext attack, chosen encrypted key attack, toggling of bits in ciphertext or encrypted key, differential cryptanalysis, differential fault analysis, and other cryptanalysis techniques. DES is described in detail in Federal Information Processing Standard (FIPS) 46, Nov. 23, 1977; and in FIPS PUB 46-3, Oct. 25, 1999.

DES is considered obsolete because it has been successfully cracked using differential cryptanalysis with massive amounts of plaintext-ciphertext pairs. But in the present invention exemplified in FIGS. 5 and 6 there need not be any plaintext-ciphertext pairs. The decrypted programs are stored in EEPROM 295 in cartridge 126 and are not revealed outside of crypto processor 126. Likewise much of the data goes no farther than EEPROM 295 and processor core 134. By encrypting only program instructions and literal data in instructions that are executed in processor core 134, but leaving unencrypted the programs and data 96 that are transferred on bus 93 to portable game system 44, in FIG. 7, there will be no plaintext-ciphertext pairs that a pirate could use in a cryptanalysis attack. Without known plaintext, DES is more than adequate for this application.

Small amounts of known doubly encrypted data are accessible on bus 61, but the singly encrypted data from track 148 is not known with enough certainty to assemble plaintext-ciphertext pairs. Hence key 131 would be very difficult to discover.

To distinguish encrypted data from non-encrypted data on disk 43, a table can be recorded on disk 43 with tags to indicate which address ranges are reserved for encrypted or non-encrypted data. Tags could also be recorded in header data that precede encrypted data or precede non-encrypted data in downloaded software.

Symmetric key block encryption uses the same secret key for decryption and for encryption. Typically this key is at least 64 bits and preferably 128 bits or larger. In the preferred embodiment, there is not one master key in processors 303 or 126, because if it were compromised, perhaps by an employee or contractor of the game vendor, the processors would become useless. Instead, in the preferred embodiment, each of processors 303 and 126 includes key table 110 so that secret key K1 can be changed in mid production of any game title by changing to a different key in the table. If the key bits in table 110 are intermingled with unused random decoy bits, anybody who accesses the bits will not know which bits are key bits without also reading the on-chip ROM or RAM program (FIG. 18a) that can find bits that are key among bits that are decoys and reconstruct their sequence.

Key table 110 in processors 303 and 126 are preferably stored in an SRAM powered by battery 130, so that attempts to probe, scan, or peel processor chips 303 or 126 would break a power trace and destroy the keys in table 110. If key table 110 were mask programmed or stored in EEPROM or flash ROM, that would reduce security of the keys, unless the key bits were rearranged and/or distributed among decoy bits. Keys should not be externally readable from security processor chip 84, crypto processor 303, or crypto processor 126. Key table 110 should be physically protected against probing, chip peeling, scanning electron microscopy, and voltage-contrast imaging. Physical security for chip keys is described in detail in my U.S. Pat. No. 4,278,837 for crypto microprocessors that use bus encryption.

In the preferred embodiment, a substantial portion of downloaded game programs and data on tracks 82 should be encrypted to deter pirates from bypassing security processor 84 and/or processor 303. But some of the downloaded game programs and/or data may be unencrypted, especially game data that is revealed on LCD screen 22. The details of processors 303 and 126 are given here only as examples and numerous other designs may be used.

Figure 5:
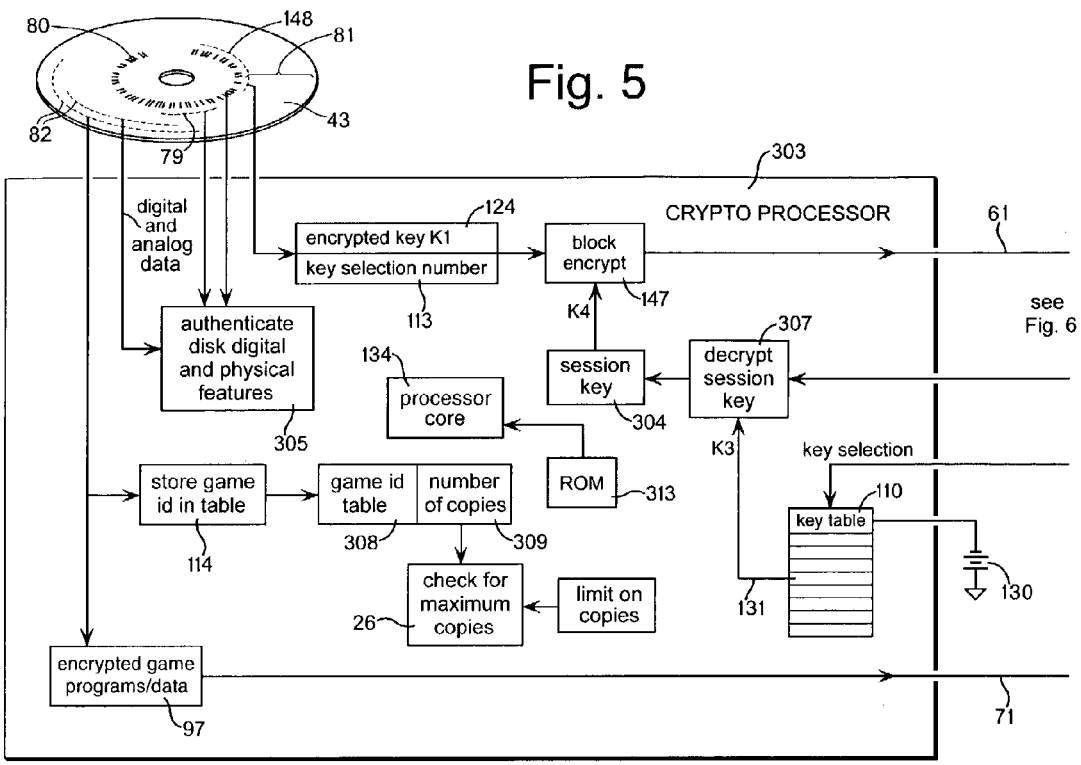
FIG. 5 is a block diagram of the console crypto processor 303.

As shown in FIG. 5, a variable session key 304 is used by processor 303 to communicate with cartridge processor 126 in this example. The encrypted key 124 (key K1) from track 148 is preferably doubly encrypted in processor 303 together with a key selection number 113 by block encryption process 147 under control of session key 304 that is different every time a download is made. Recorded in track 148, or preferably a different track, is a randomly generated key selection number 113 that is encrypted together with doubly encrypted key 124 by encryption process 147. The doubly encrypted key K1 is sent on bus 61 from processor 303 to cartridge processor 126 (FIG. 6) where it is first decrypted by block decryption process 99 under control of the same randomly generated session key 304. Decryption process 99 produces the encrypted key 124 (key K1) and key selection number 113 that were read from track 148.

The reason why session key 304 is used by processor 303 to communicate with cartridge processor 126 is not to conceal data that can be openly read from track 148, but rather to prevent pirates from bypassing processor 303 by sending unauthorized data directly into processor 126 on buses 61 and 71.

After being decrypted by process 99, singly encrypted key 124 is block decrypted by process 142 under control of key 98 (key K2) selected from key table 110. A pirate would not learn the values in key table 10 if he discovers the value of the key selection number 113 which may be different for each game product and/or each pressing master.

After decryption process 142 decrypts key 100 (key K1), the encrypted programs and data passing through buffer 97 can be decrypted by process 111 under control of key K1 which is preferably different for each game product and/or each pressing master. The programs and data decrypted by process 111 are stored into EEPROM 295 from which processor core 134 in processor 126 in cartridge 287 executes the program instructions to produce game data in SRAM 239 which is sent to portable game system 44 as described below with reference to FIGS. 7 and 8.

To prevent a pirate from supplying an unauthorized encrypted K1 key on bus 61 or supplying a bogus session key, session key 304 is encrypted by process 306 under control of a symmetrical key 131 (key K3) that is randomly selected from the table of keys 110. In effect, processor 126 is telling processor 303: "Here is the encrypted session key that you must use to send me encrypted data on bus 61 and here is a number that tells you which chip key you must use to decrypt this session key."

Session key 304 may be generated in processor 126 (FIG. 6) by pseudo random number generator 311 seeded by a thermal noise source 310 as described in U.S. Pat. No. 4,694,412.

In FIG. 5, process 114 reads a game identifier from disk 43, stores it in table 308, and counts in table 309 the number of software copies of each game downloaded to bus 71. Process 26 compares the number of copies downloaded to a predetermined maximum value for a given game and inhibits downloading of that game if the maximum is reached.

The encrypted software read from tracks 82 may be doubly encrypted in processor 303 using a second session key, but this may not be necessary because process 136 verifies that each decrypted block of software being stored in EEPROM 295 is valid or not by doing a cyclic redundancy check (CRC) or hash value on several blocks. Any attempt to toggle bits in blocks of encrypted software on bus 71 would result in rejection of several blocks and rereading from disk 43. Such rejection should preferably cover several blocks so that a pirate will not know which blocks have been accepted or rejected or which blocks had or did not have checksums or hash values. MD5, SHA-1 or similar hashing methods may be used to compute a hash value which may consist of 128-bit, 160-bit, or other size binary number which is compared (by process 136) to a predetermined hash value encrypted in some or all of the encrypted blocks.

Figure 6:
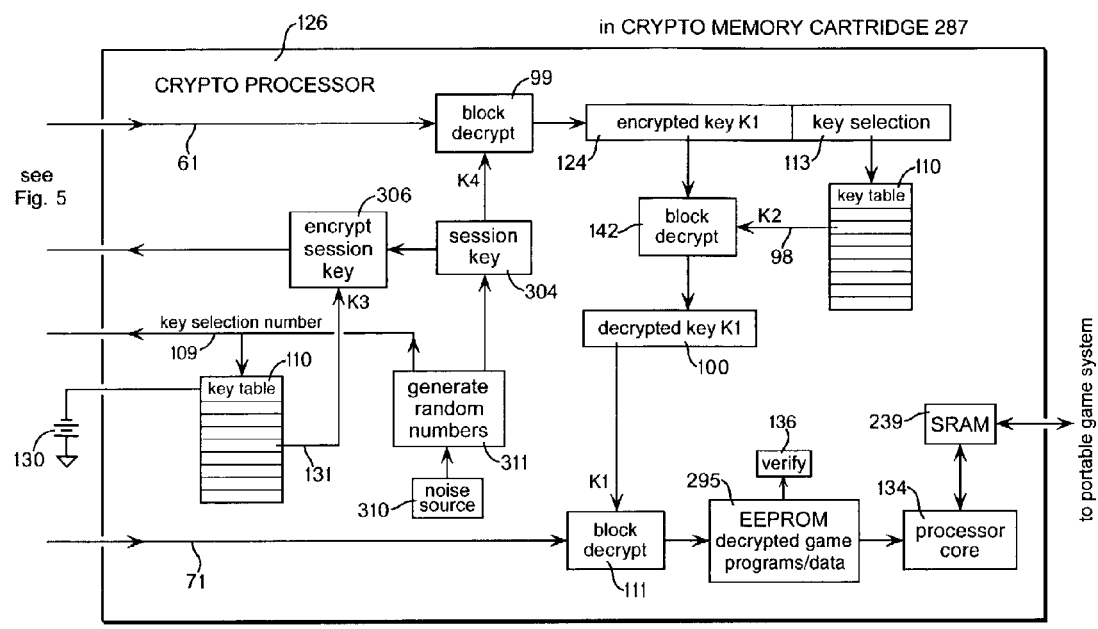
FIG. 6 is a block diagram of the crypto functions of a game cartridge memory processor 126.

FIG. 6 is discussed above with reference to FIG. 5.

Figure 7:
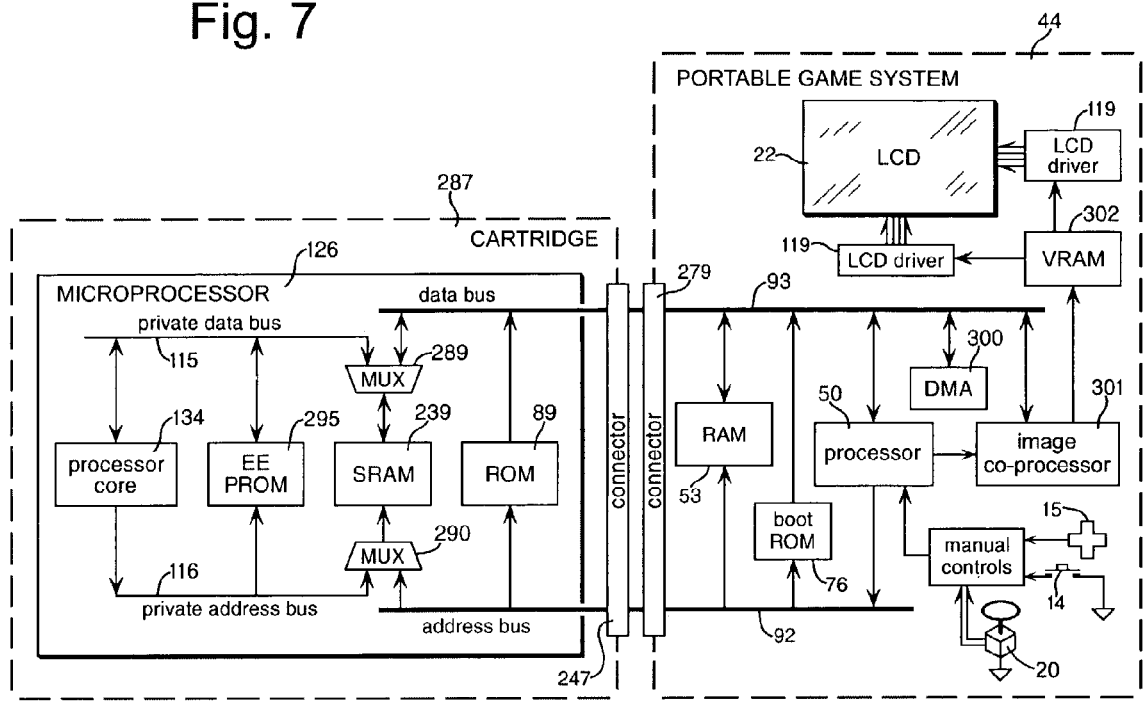
FIG. 7 is a block diagram of the memory and bus functions of a game cartridge processor 126 and how it communicates with a portable game system 44.

FIG. 7 is a block diagram that illustrates one embodiment of the non-cryptographic features of the invention which in this example is a memory cartridge 287 containing processor 126 that is connected, during game playing, through bus connectors 247 and 279 to a portable game system 44.

Portable game system 44 has a processor 50 that, when power is turned on, initially executes a small program in boot ROM 76 to authenticate a connected memory cartridge. In FIG. 7 this memory cartridge is cartridge 287 containing crypto processor 126. The boot program in ROM 76 verifies that predetermined authenticating trademark data is present at predetermined byte locations in ROM 89, and if they are present, transfers control to an initializing program in ROM 89.

Crypto processor 126 includes private data bus 115 and private address bus 116 that are not accessible outside of processor 126. Program instructions stored in EEPROM 295 for execution in processor core 134 are not accessible outside of processor 126. Processor core 134 can communicate with external data bus 93 through SRAM 239 by addressing on private address bus 116 the memory addresses reserved for SRAM 239 and can write data into and read data from SRAM 239 locations by way of private data bus 115. SRAM 239 is like an internal dual-port RAM and is bus multiplexed so that processor 50 can read data from and write data to SRAM 239 when processor 134 is not addressing SRAM 239. Processor 134 and processor 50 can communicate by semaphore, mailbox interrupts, or other multiprocessing technique.

To communicate by semaphore, processor 134 writes a predetermined value to a memory address reserved for a semaphore flag which can be one or more bits in SRAM 239. During a write cycle by processor 134, processor 50 is inhibited from addressing SRAM 239 by multiplexer (MUX) 290 and any addressing of SRAM 239 by processor 50 is pending, because multiplexer 289 inhibits access to external data bus 93. After multiplexer 290 provides address bus 92 with access to SRAM 239, processor 50 reads the semaphore flag. If the predetermined semaphore flag value indicates to processor 50 that game data has been stored into SRAM 239 by processor 134, processor 50 or DMA 300 can then address and read the game data from SRAM 239.

After this data is read from SRAM 239 by processor 50, processor 50 may write data to SRAM 239 and then write a predetermined value to a memory address reserved for a semaphore flag which can be one or more bits in SRAM 239. This flag from processor 50 may tell processor 134 that control data (one or more bits) from manual controls (push button switch 14, cross-switch 15, joystick 20, touchpad, etc.) or other data has been stored into SRAM 239 by processor 50 and is ready for processing by processor 134. This may also cause a "mailbox" interrupt in processor 134 if address decoder 293 (in FIG. 2) in cryptoprocessor 126 monitors external address bus 92 for the reserved semaphore flag address. Interrupts of processor 134 are not recommended however, because pirates will force interrupts while searching for programming or logic errors in cryptoprocessor 126.

Alternatively, writing of a semaphore flag to cryptoprocessor 126 may be restricted to one reserved address in cryptoprocessor 126 for one bit that may be set and reset without multiplexers 290 or 289 or SRAM 239 being selected.

Address multiplexer 290 prevents bus contention by insuring that SRAM 239 cannot be addressed by both address buses 92 and 116 simultaneously. Likewise data bus multiplexer 289 insures that reading from SRAM 239 and writing to SRAM 239 can occur either on external data bus 93 or on private data bus 115 but not simultaneously. Multiplexer 289 is bidirectional so that data can be written into and read from SRAM 239. Multiplexers 289 and 290 are discussed below with reference to FIG. 8.

Processor core 134 in this example, includes an ALU, registers, a stack, instruction decoder, and a program counter to address each executable instruction in sequence in EEPROM 295, fetch each instruction, and increment the program counter to address the location of the next instruction in EEPROM 295. Processor 134 may address SRAM 239 locations for both reading and writing of data. However it is not recommended that the program counter may address SRAM 239 locations. This is to prevent pirates from causing execution of trojan programs from SRAM 239. For similar reasons, it is not recommended that processor 134 be able to modify instructions, except during loading of program data and other data into EEPROM 295 during the cryptographic downloading mode described above with reference to FIG. 1.

Processor 134 in this example, executes programs stored in EEPROM 295 that generate intermediate game data that may represent variable characteristics of one or more player controlled objects or characters, and/or non-player objects that move across the background, and/or 2D or 3D views of a simulated world that includes background scenery. The game data generated in processor 134 may represent positions, locations, and directions of player controlled game objects such as characters with articulated arms and legs and predefined textures. Even if animation of arms and legs is performed by image coprocessor 301, the spatial coordinates, orientation, and direction of movement of the character may be specified by processor 134 executing the program instructions stored in EEPROM 295.

The game data generated in processor core 134 may also represent positions, locations, and directions of points of view, and may also represent game scores, game status, maps, statistics, object selection, icons, verbal descriptions, instructions, menus, other displayable data, and/or signals to trigger music, voice sounds, and sound effects. Processor core 134 may also test for some collisions between moving objects and generate images of moving objects even if image coprocessor 301 already performs such functions.

Data representing background scenery in 2D portable game systems may be stored in ROM 89 because backgrounds are easily readable or easily reconstructed by pirates. But the program instructions that determine when and what backgrounds are needed and what changes are made to backgrounds (such as a door remaining open) may be executed by processor 134 from EEPROM 295. After processor core 134 generates and stores portions of game data into SRAM 239, it sets a semaphore flag at the reserved semaphore address to indicate that game data is ready in SRAM 239 for further processing by processor 50 or copying by DMA 300.

The passing of data between processors 134 and 50 through SRAM 239 may be done at regular or irregular time intervals. In one example, at the beginning of each vertical blanking interval or other regular interval, processor 50 may execute a program stored in ROM 89 that tests and responds to the semaphore and enables DMA 300 which copies one or more portions of data from SRAM 239 to display RAM 53 or direct to image processor 301. This data may include, for example, positions of a player controlled object and/or other objects that move across the background. Alternatively, processor 50 may execute a small program stored in ROM 89 that copies moving object data from SRAM 239 to RAM 53 for further processing.

Image coprocessor 301 in 2D systems may perform scrolling, flipping, blending, scaling, rotating, fading, windowing, and other image processing functions on display data stored in display RAM (VRAM) 302 for display on LCD screen 22. In 3D systems, image coprocessor 301 may perform coordinate transformations of polygons, texture rendering, bump mapping, lighting and shadows, and rasterizing polygon data into displayable pixel data in VRAM 302 for display on LCD 22.

Figure 8:
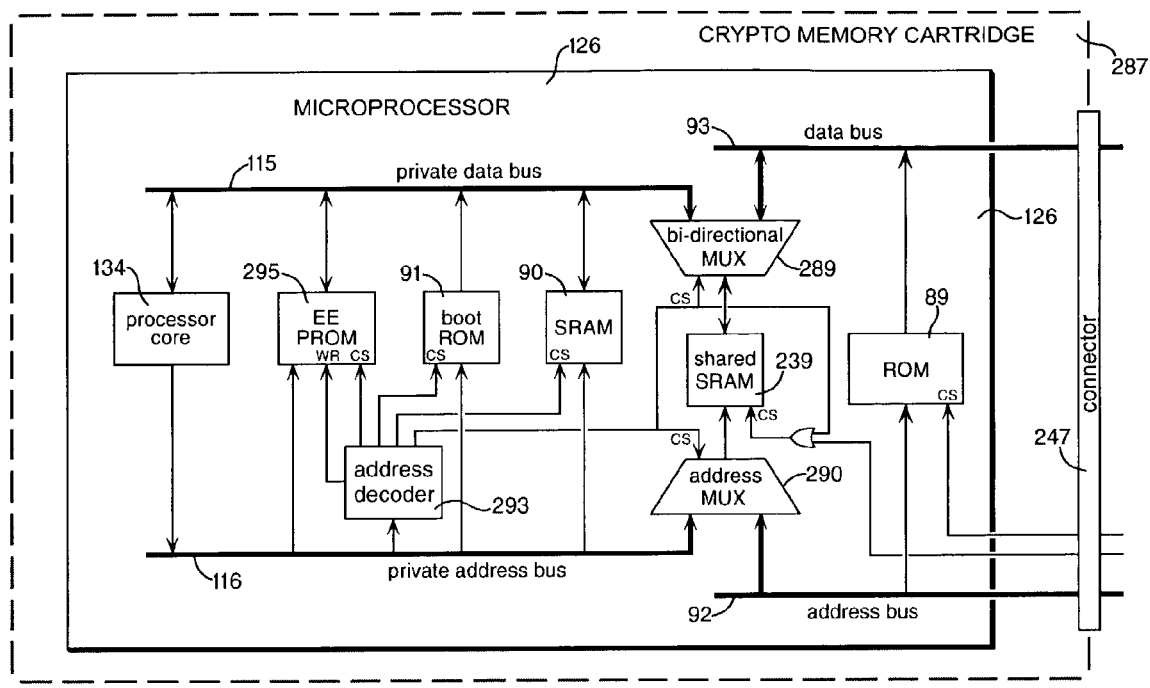
FIG. 8 is a block diagram of the memory and bus functions of a game cartridge processor 126 in greater detail than FIG. 7.

FIG. 8 is a block diagram of one exemplary embodiment of the non-cryptographic features of crypto processor chip 126. Boot ROM 91 is preferably mask programmed to operate in one of two modes, a downloading mode for use during loading of EEPROM 295 and an authenticating mode that executes at power up during use by a human player.

During downloading into EEPROM 295, processor 134 executes a program from boot ROM 91 which may perform the cryptographic functions described above with reference to FIG. 6. Data transfer on virtual buses 61 and 71, session key transfer to processor 303, and transfer of key selection number 109 to processor 303, may all transfer data through external data bus 93 and connector 247 in FIGS. 7 and 8.

The downloading program addresses EEPROM 295 as bank 1 which enables writing into EEPROM 295 in this example. Bank 0 may be the default bank for corresponding addresses limited to reading of data and fetching of instructions from EEPROM 295. The downloading program may loop through these steps: (1) writing into SRAM 239 from external data bus 93, (2) selecting multiplexers 289 and 290 and SRAM 239 to enable reading from SRAM 239 to internal data bus 115, (3) writing from internal data bus 115 into EEPROM 295 bank 1, (4) setting a semaphore in SRAM 239, and (5) deselecting multiplexers 289 and 290.

After game programs and data have been downloaded into EEPROM 295, default bank 0 is enabled in this example and thereafter EEPROM 295 may not be written into unless the downloading mode is reenabled. Later, whenever electrical power is applied to cryptoprocessor 126, processor core 134 executes digital instructions from boot ROM 91 that verify authenticity of authenticating data stored at predetermined locations in EEPROM 295 and, if authentic, transfers control to program instructions in EEPROM 295 which generate game data in SRAM 239.

Chip selection (CS) of memories and MUX gates in processor 126 are controlled by address decoder 293 so that addresses on bus 116 from processor core 134 in this example address non-overlapping contiguous areas of address space in boot ROM 91, EEPROM 295, SRAM 90, and address multiplexer 290. Address multiplexer 290 provides addressability from address bus 92 or 116 to shared SRAM 239. Bidirectional multiplexer 289 enables read/write of SRAM 239 from/to either data bus 93 or 115. If shared SRAM 239 is not being addressed by processor 134 and multiplexer 290 is not selected, then by default, SRAM 239 can be addressed from external address bus 92 if the range of addresses causes SRAM 239 to be selected through a pin on connector 247 driven by a second address decoder (not shown) in portable game system 44. The details of processor 126 are given here only as examples and numerous other designs may be used.

Referring again to FIG. 7 and FIG. 8, external address bus 92 and external data bus 93 are typically multiplexed in portable game system 44 and cartridge 287 to minimize pins on bus connectors 247 and 279. Connectors 247 and 279, when connected, also supply battery power, ground, chip enable, clock, and other connections to cartridge 287.

FIG. 9 illustrates functions of game server 120 that provides downloadable game software. Game software is stored in database 122 together with corresponding key selection numbers 109 and 113. Customer records for each game title are stored in database 143 by disk 43 serial number 101. When a software download is requested over an Internet or other network link 121, game identifier 114, unit id 139, and encrypted control record 94 are uploaded to server 120, as described above with reference to FIGS. 1 and 2.

Using game identifier 114, database reader 123 reads data from database 122 to get the corresponding key selection number 109. Selection number 109 selects key K5 from key table 110. Encrypted control record 94 is then decrypted by block decryption 99 under control of key K5 to produce decrypted serial number 101 and RSA id signature 144. Process 102 checks serial number 101 against RSA id signature 144 and database 143 and determines which session number 141 is next for downloading game software. Database reader 123 reads software from database 122 indicated by session number 141 and game identifier 114. Non-encrypted software 96 is transmitted to a user's video game console 42 as described above with reference to FIG. 2.

Before software 97 is downloaded, it is block encrypted by process 133 under control of a randomly generated session key 100 (key K1). Key selection number 113 selects key K2 from key table 110 and block encryption process 129 under control of key K2 encrypts key K1 with unit id 139 to produce encrypted key 124 which is downloaded to the user's console 42 for use in cryptoprocessor 303 (FIG. 2).

Figure 10:
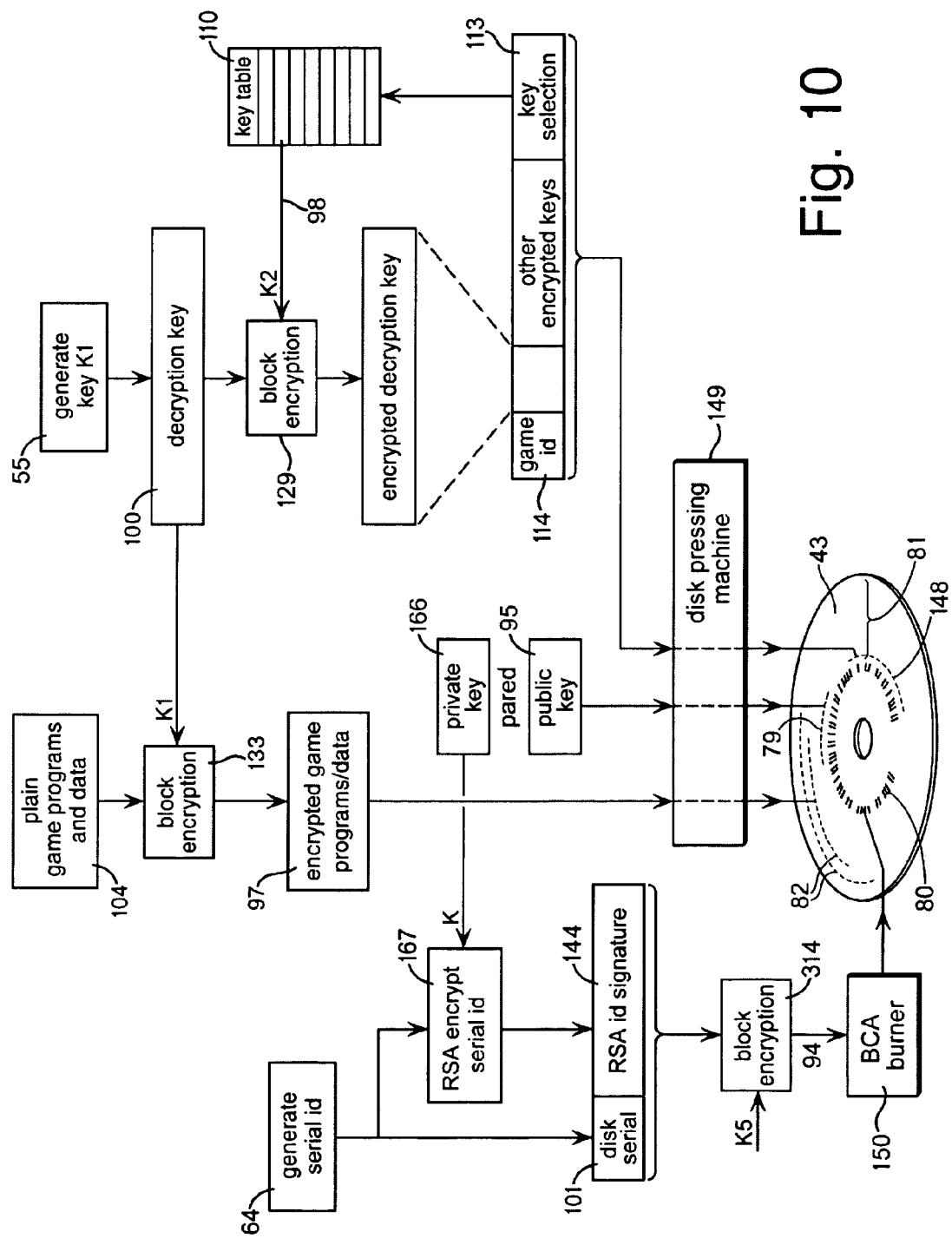
FIG. 10 is a block diagram of crypto functions used in a disk pressing plant.

FIG. 10 shows a disk fabrication process for writing data onto disk 43, for embodiments in which encrypted software 97 is distributed on disk 43. Random number generator 55 generates a pseudo random symmetrical encryption/decryption key 100 (key K1). Key 100 controls block encryption 133 which encrypts plain game programs and data 104 to produce encrypted game programs/data 97 which are molded as tracks 82 into disk 43 by disk molding/pressing machine 149. Key 100 (key K1) is also encrypted by block encryption process 129 under control of key 98 (key K2) selected from key table 110. A randomly generated key selection number 113 specifies which key 98 was selected. Block encryption process 129 encrypts key 100 to produce an encrypted decryption key which together with game identifier 114, other encrypted keys, and key selection number 113 are molded as track 148 into disk 43 by disk molding/pressing machine 149 at the same time tracks 82 are pressed. During the same molding process 149, RSA public key 95 may be molded into disk 43 in track 79. RSA public key 95 is paired with RSA private key 166.

After molding/pressing of disk 43 is complete, a bar code signature is generated, as described in detail in U.S. Pat. No. 6,175,629. Adder 64 generates a disk identification serial number 101 which is different for each disk. RSA encryption process 167 under control of private key 166, encrypts the disk serial number 101 to produce a disk signature 144 of 1024 bits or more. The disk serial number 101 is preferably block encrypted together with RSA disk signature 144 by block encryption process 314 (K5 from table 110) to prevent pirates from substituting a serial and signature that agree with each other, but are bogus. The encrypted signature and serial are burned as a bar code 80 in disk 43 by BCA burner 150.

Later when disk 43 is read by disk reader 83 (FIGS. 1 and 2), disk controller 84 or crypto processor 303 (process 305) reads public key 95 from track 79, decrypts disk serial number 101 and RSA signature 144 from BCA bar code 80, and decrypts RSA signature 144 under control of public key 95 to produce a decrypted serial number which is compared with disk serial number 101. If the decrypted serial number and disk serial number are not the same number, disk controller 84 or crypto processor 303 ceases reading from disk 43, because it failed authentication.

The RSA public-key cryptosystem has been used as an example, but ECC, DH, or other public-key cryptosystems may be used for encryption process 167.

Figure 11:
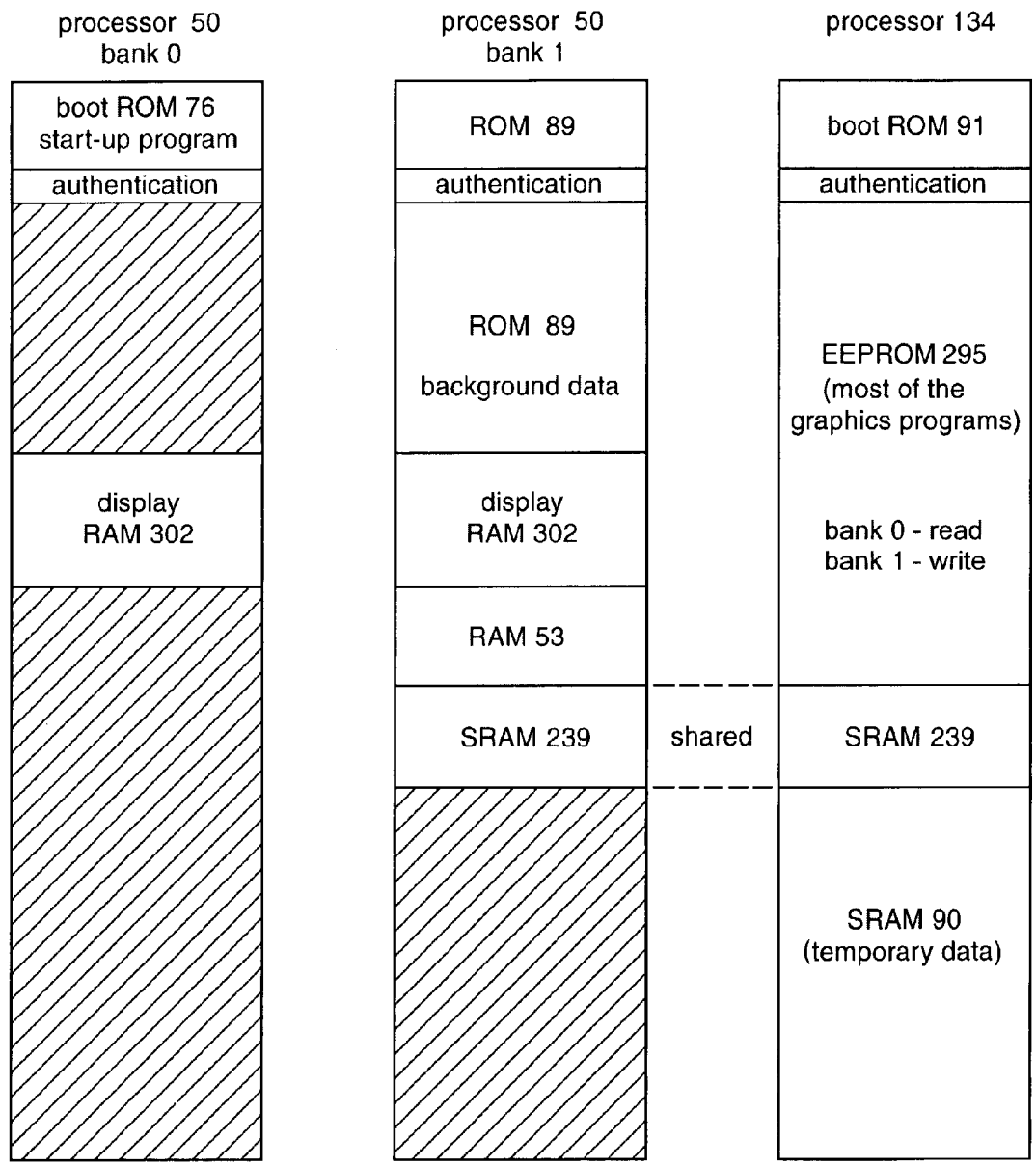
FIG. 11 is an example of a memory map of memory used by processors 50 and 134.

FIG. 11 shows examples of memory maps of memory space allocated to various digital memory devices addressed by processor 50 and processor 134. When processor 50 begins executing at power up, a small start-up program in memory bank 0 in boot ROM 76 (FIG. 1) compares authenticating data in ROM 89 in cartridge 287 to authenticating data in ROM 76. If they differ, then a program or programs in ROM 89 in cartridge 287 are not executed. If the authenticating data agree, then processor 50 switches to bank 1 and begins executing a program in ROM 89 that may be different for each game.

Meanwhile, at power up, processor 134 executes a second start-up program from boot ROM 91 (see FIG. 8) that initializes SRAM 90 and SRAM 239 and does a semaphore handshake with the program in ROM 89 being executed simultaneously in processor 50. Processor 134 executes an authenticating program from boot ROM 91 and writes a semaphore flag of predetermined value into shared SRAM 239 or sets a latch that a program from ROM 89 monitors in processor 50. Processor 50 responds by copying authenticating data from ROM 89 into SRAM 239 that processor 134 reads and compares to authenticating data stored in EEPROM 295. If the authenticating data agree, processor 50 transfers control to a game program in EEPROM 295 which may include much of the program instructions and other data for the game.

The game program in EEPROM 295 stores temporary data into working SRAM 90 where the data cannot be read from outside of crypto processor chip 126. When processor 134 generates game data representing a location of a moving object for display on LCD screen 22, processor 134 writes the game data and a semaphore flag into SRAM 239.

Figure 12:
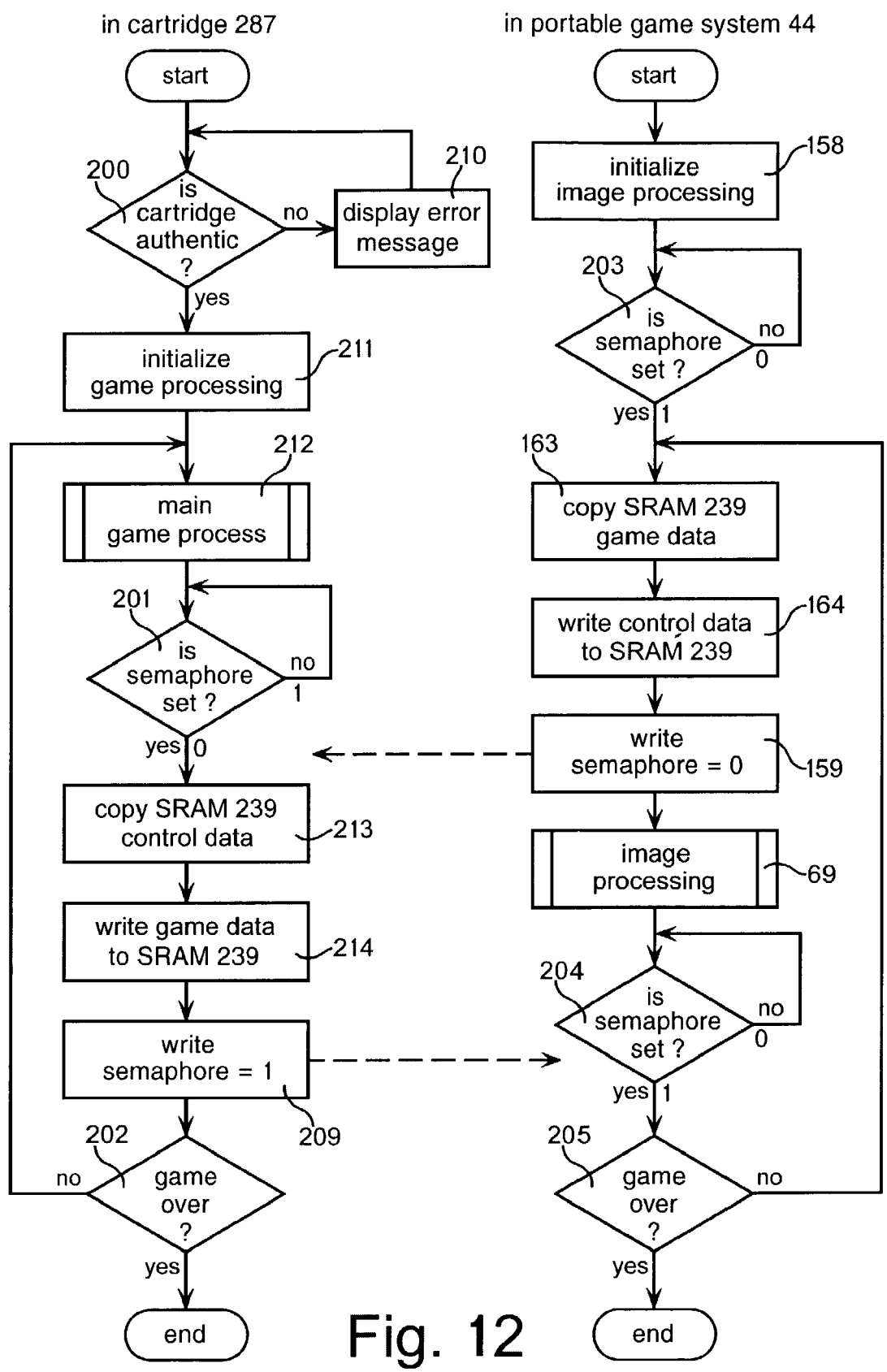
FIG. 12 is a flow chart illustrating program processes and semaphore communication between two different processors operating in parallel.

FIG. 12 is a flow chart of the parallel operation of both portable game system 44 and cartridge 287. In cartridge 287, step 200 tests authenticating data to determine if ROM 89 in cartridge 287 is authentic. If not, then step 210 displays an error message on LCD 22 and loops until an authentic cartridge is inserted. Step 211 initializes SRAM 90 and SRAM 239 in microprocessor 126 and sets the semaphore flag to 0. Step 212 is the main game process which generates game data (such as locations of characters) in response to control data manually generated by operation of cross-switch 15, push button switch 14, joystick 20, or other manual control devices.

Step 201 determines whether the semaphore flag is set to 0. If the flag is not 0, step 201 loops until the semaphore is set to 0 by step 159 in the portable game system 44. Step 213 copies the new input control data from SRAM 239 into SRAM 90 (FIG. 8) for use during the next cycle of step 212. This input control data was stored into SRAM 239 in step 164 in FIG. 12 for portable game system 44. Step 214 writes into SRAM 239 the game data generated by main process 212. This output game data will be copied in step 163 and used to generate display data in image processing step 69 in FIG. 12. Step 209 sets the semaphore flag to 1 which tells steps 203 or 204 that the game data is ready to be read from SRAM 239. Step 202 determines whether the game is over and if the game is not over, loops back to step 212 to do another iteration of the main game process.

Meanwhile, portable game system 44 begins step 158 which initializes VRAM 302 and RAM 53. Step 203 then determines if the semaphore is set to 1. If the semaphore is 0, step 203 loops until processor 134 sets the semaphore flag to 1 in step 209. Step 163 copies game data from SRAM 239 to RAM 53 or other memory in portable game system 44. Step 164 writes control data from manual controls into SRAM 239 for output to cartridge 287 Step 159 sets the semaphore flag to 0, even if no control data was written in step 164. Setting the flag to 0 in step 159 tells step 201 in cartridge 287 to proceed with step 213 to write new game data into SRAM 239. After step 159, step 69 is the main image processing step in which processor 50 and image processor 301 generate display data from the input game data read from SRAM 239 and store the generated display data into VRAM 302 for display on LCD 22. Step 204 determines if the semaphore is set to 1 and if not, loops until it is set to 1 by step 209. Step 205 determines whether the game is over and if not, loops back to step 163.

FIG. 13 is an example of a memory map of program instructions data and graphics data stored in EEPROM 295 for execution and processing by processor 134. Some of these instructions may be stored in ROM 89 instead. Whether specific program instructions should be stored in EEPROM 295 or ROM 89 may be different for different games.

FIG. 14 is an example of a memory map of program instructions data and other data stored in ROM 89 in cartridge 287 for execution and processing by processor 50 in portable game system 44. Some of these instructions may be stored in EEPROM 295 instead. When step 163 in FIG. 12 copies game data from SRAM 239 to a memory in portable system 44, this step is performed by program instructions that are executed in processor 50 and are mentioned in the FIG. 14 memory map. For example, these instructions may copy position data, location data, direction data, and/or texture data from SRAM 239 into RAM 53 or other memory in portable system 44. Likewise when step 164 in FIG. 12 writes control data to SRAM 239, this step is performed by program instructions that are executed in processor 50 and are mentioned in the FIG. 14 memory map. This control data may be generated by manual operation of cross-switch 15, push button switch 14, joystick 20, touchscreen 23, and/or other manual control devices.

Figure 15:
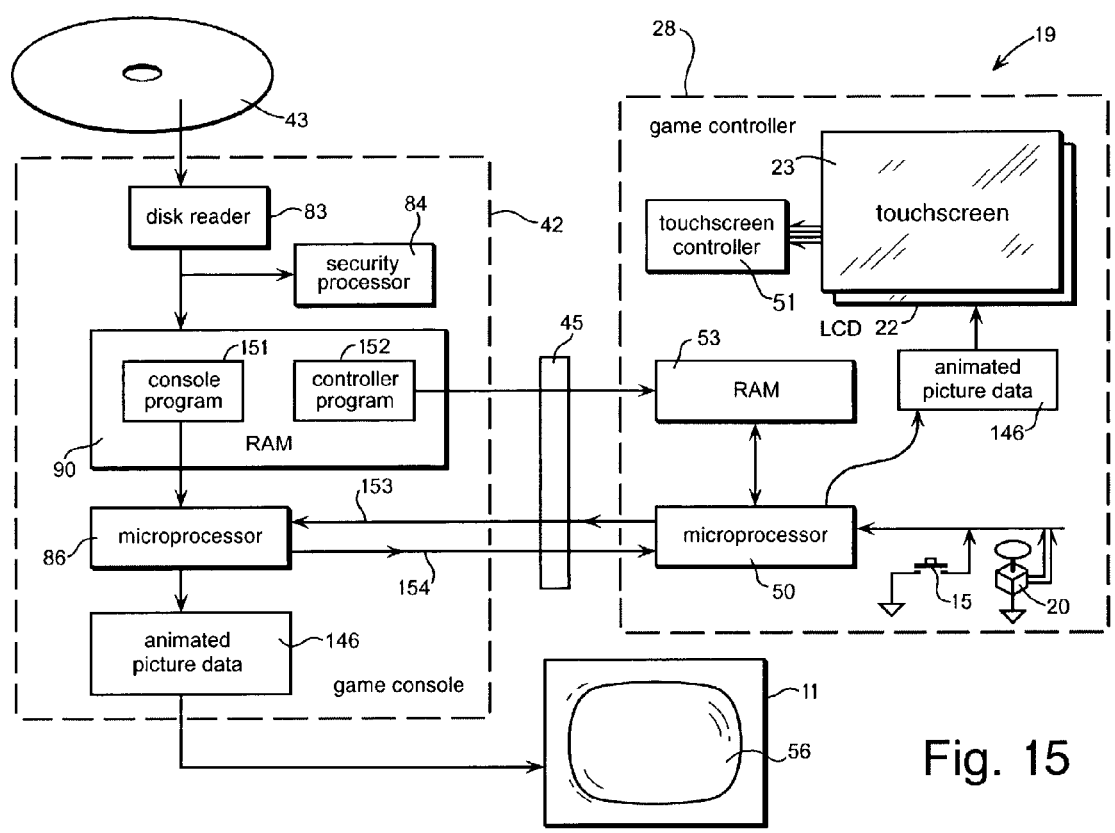
FIG. 15 is a block diagram illustrating downloading of unencrypted programs from a distribution disk 43 and console system 42 and data link 45 to a portable game system 28 that has a touchscreen 23.

FIG. 15 shows an exemplary block diagram illustrating downloading of non-encrypted programs from distribution disk 43 through console system 42 and data link 45 to portable game system 28 being operated as a handheld game controller. When disk reader 83 reads game programs from disk 43 into RAM 90, the programs in this example are of two kinds: console program(s) 151 with associated data, and controller program(s) 152 with associated data. Controller program 152 is transmitted to RAM 53 in handheld portable game system 28 being operated as a game control unit. Program 152 in RAM 53 is executed in microprocessor 50. Console program 151 is stored in RAM 90 and is executed by microprocessor 86 which generates animated picture data 146 representing one or more animated characters performing actions. This data stored in RAM 146 is converted to a video signal that is passed to TV 11 and is displayed as animated pictures on display 56. Microprocessor 86 also generates data records which it sends (arrow 154) to portable game system 28.

Execution of console program 151 is controlled by data received (arrow 153) by console 42 from microprocessor 50 in control unit 28. Microprocessor 50 receives (arrow 154) the data records received from console 42 and this data affects execution of program 152 in microprocessor 50 which also receives manually entered input signals from cross-switch 15 (only one of the 4 switches is shown), analog joystick 20, touchscreen 23, and/or other manual controls. These input signals result from a human player's decisions based on animated pictures that are displayed on LCD 22 from animated picture data 146 generated by microprocessor 50 executing program 152 in RAM 53. The input signals also control execution by microprocessor 50 which sends corresponding data records (arrow 153) to console 42.

Figure 16:
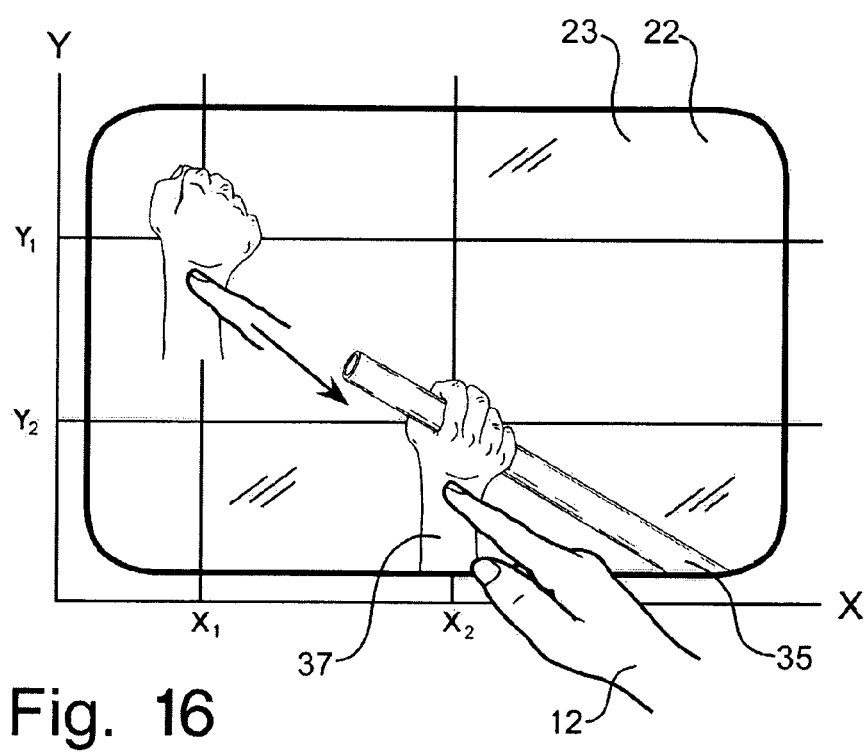
FIG. 16 is a touch-sensitive LCD screen with Cartesian coordinates superimposed to illustrate selection and movement of simulated objects in two dimensions on an LCD picture.

FIG. 16 illustrates manual use of touchscreen 23 with X,Y coordinates for indicating a two-dimensional location on the underlying LCD screen 22 (FIG. 15). FIG. 16 shows hand 37 shaped as a fist and located at coordinates ($X_1$ $Y_1$). When human player 12 places her finger over the image of hand 37 on touchscreen 23 and moves her finger on touchscreen 23 in the direction of the arrow to location ($X_2$ $Y_2$)—the hand image on LCD 22 follows her finger as described below with reference to FIG. 19. Pipe 35 intersects coordinates ($X_2$ $Y_2$) and hence when hand 37 intersects pipe 35 at coordinates ($X_2$ $Y_2$) the program being executed in microprocessor 50 in control unit 47 interprets this collision as a command to show hand 37 grasping whatever object is at coordinates ($X_2$, $Y_2$)—in this example pipe 35.

The polygon vertex data which is rendered to form the image of hand 37 on LCD 22 are then modified by microprocessor 50 (FIG. 15) to show hand 37 grasping pipe 35 on LCD 22. If player 12 implements this action, microprocessor 50 sends data to console 42 where microprocessor 86 (FIG. 15) modifies corresponding polygon vertex data which is rendered to form the image of hand 37 in the generated video images displayed on TV 11 (FIG. 15). Hence, when touchscreen 23 is used to move an object in the picture on LCD 22 from one LCD location to another location, the resulting action appears on both the LCD 22 and TV screen 56.

The X,Y coordinates in FIG. 16 may be denominated in pixels or millimeters and refer to the visible area of LCD screen 22 and corresponding area of touchscreen 23. Since the picture on LCD 22 is a two-dimensional picture, there is no Z coordinate, although Z may represent a non-spatial variable such as finger pressure. The X,Y coordinates on LCD screen 22 should not be confused with simulated coordinates X,Y,Z in a simulated 3-dimensional world populated with animated characters, a world in which Z represents height.

Figure 17:
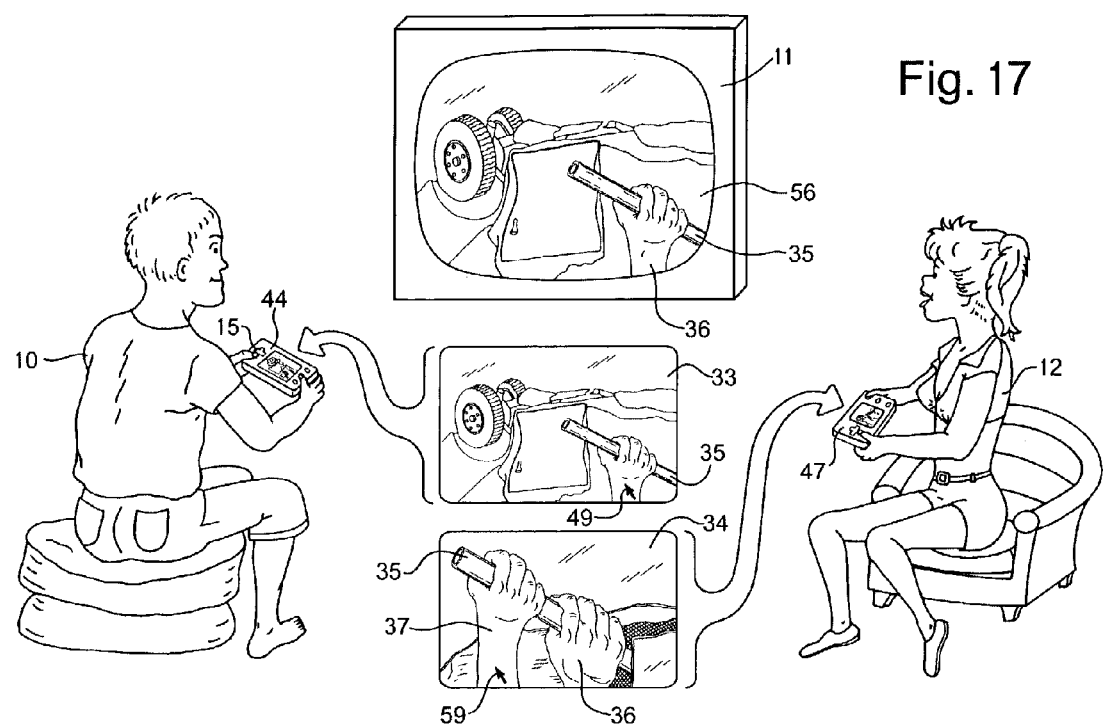
FIG. 17 is a perspective view of two human game players operating portable game systems having LCD devices that display multiple articulated body parts of player controlled characters similar to TV images.

FIG. 17 is a perspective view of two human game players operating portable game systems having LCD devices that display multiple articulated body parts 36 and 37 of player controlled characters that are similar to TV images of those characters.

FIG. 18 is an example of a memory map illustrating software stored in RAM 90 in console 42.

FIG. 18a is an example of a memory map illustrating software stored in ROM 313 in crypto processor 303 (see FIG. 5) including instructions for authenticating digital data and physical features in disk 43 and instructions for performing block encryption and decryption.

Figure 19:
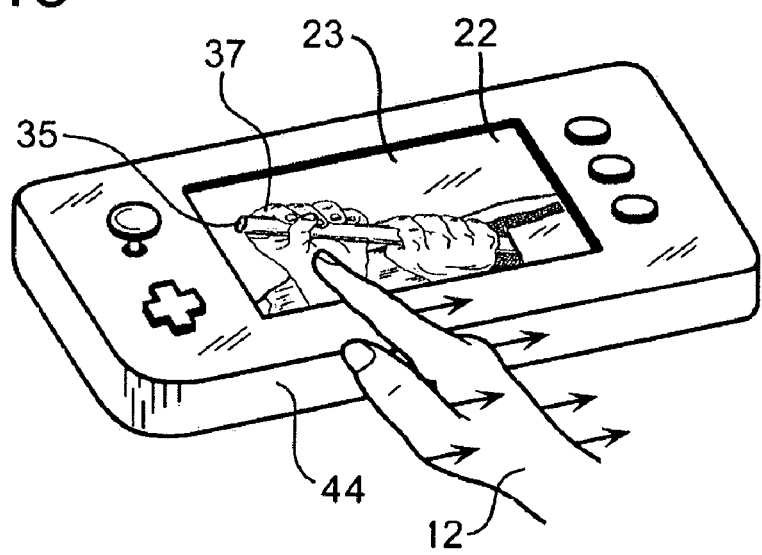
FIG. 19 is a perspective view of a portable game system 44 having a touch screen 23 illustrating manually controlled movement of a selected picture object.

FIG. 19 illustrates use of touchscreen 23 to replace the cursor control. Instead of using cross-switch 15 in FIG. 17 to position cursor 49 on hand 36 or cursor 59 on hand 37, the preferred method in FIG. 19 is for human player 12 to touch her finger to touchscreen 23 overlying the LCD image of hand 37 and slide her finger across touchscreen 23 to a new location over pipe 35 to cause corresponding movement of hand 37 grasping pipe 35. Touchscreen 23 signals the finger location to touchscreen controller 51 (FIG. 15), which converts the location to physical X,Y coordinates, which processor 50 uses to calculate a new LCD location for displaying hand 37. Thus simulated hand 37 will follow the player's moving finger on the touchscreen without any need for a cursor. The image of hand 37 substitutes for a cursor. When the location of hand 37 is within preprogrammed coordinates for pipe 35, processor 50 (FIG. 15) recomputes the pixels representing hand 37 in successive frames, so that the hand appears to grasp and move pipe 35 displayed on the LCD. See further discussion above with reference to FIG. 16.

Processor 50 also sends a series of data records to console 42 selecting a branch in the branching structure of alternative sequences of hand movements, showing hand 37 moving to the location of pipe 35, rotating to a new angle facing pipe 35, and grasping pipe 35, the image of which is separately generated with the corresponding size and orientation. Processor 86 (FIG. 15) or graphics coprocessor (not shown) in console 42 then generates the corresponding sequence of rendered polygons for hand 37 and pipe 35 for including in the video frame sequence. With this FIG. 19 method, players can use their hand-held game systems to indicate movement of objects to new locations in 3-dimensions and indicate actions to be performed which are then typically generated as composite video by generator 117 (FIG. 1) and appear on TV screen 56.

Figure 20:
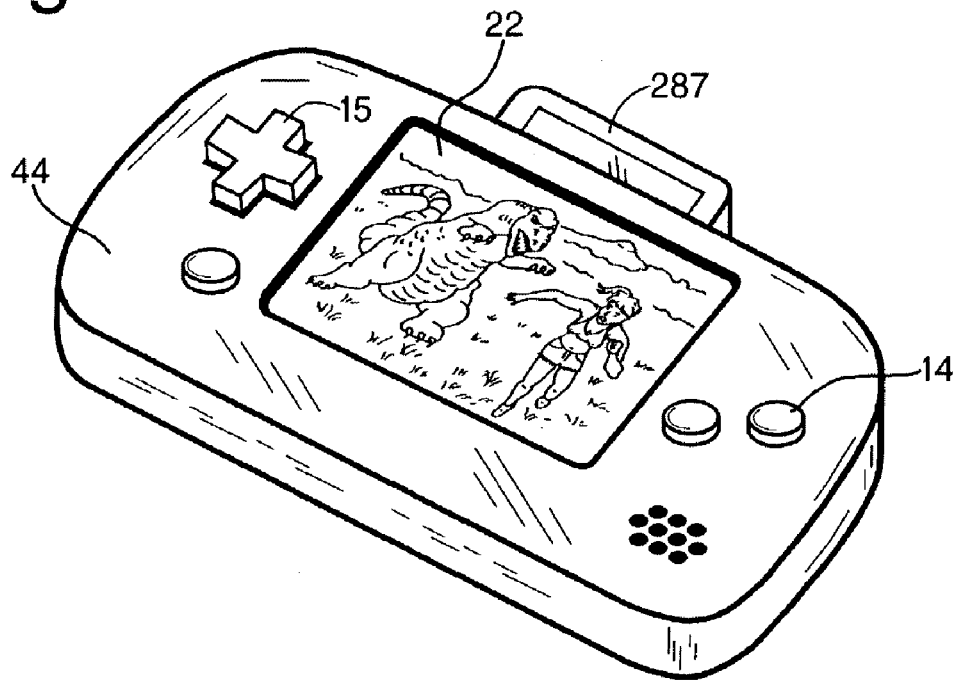
FIG. 20 is a perspective view of a portable game system 44 having a crypto memory cartridge 287 and displaying a 3D image of a player character and a non-player character.

FIG. 20 is a perspective view of a portable game system 44 displaying a 3D picture on LCD 22 of two animated characters that have multiple body parts. Movement of the body, arms, and legs of the human-like player character are controlled by manually operated control devices such as cross-switch 15, push button switches 14, touchscreen 23, and other manually operated devices. One embodiment of cartridge 287 is shown in FIG. 20 inserted into portable game system 44.

Figure 21:
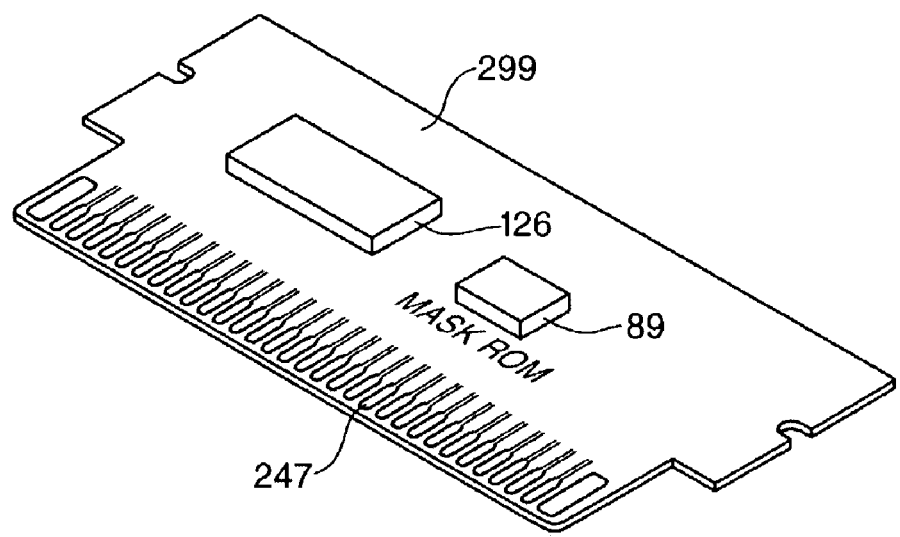
FIG. 21 is a perspective view of a cartridge circuit board having crypto processor 126 and mask ROM 89 attached to the circuit board.

FIG. 21 is a perspective view of a cartridge circuit board 299 with crypto processor 126 and mask ROM 89 attached. ROM 89 can be a separate chip as shown, or it can be included on the crypto processor 126 chip.

As used herein, the term "molded" includes injection molded, pressed, stamped, and other disk fabrication methods. Serial transmission may include parallel transmission.

The term "video" includes composite, non-composite, RGB, monochrome, color, analog, digital, raster scanned, and the like.

The term "LCD" (liquid crystal display) has been used herein as an illustrative example of any display apparatus having discrete picture elements.

The term "program" as used herein may consist of more than one loadable module and typically includes executable instruction data and any data that is typically part of a program module or modules.

The processes of encryption and decryption specified herein may be performed by software, i.e. program instructions executed in a processor core with data tables such as the S-boxes (substitution boxes) that are used in DES. Or the encryption and decryption may be performed in dedicated crypto hardware in the processor chips, or a combination of hardware and software in the processor chips.

Although I have described my invention with a degree of particularity in connection with what is presently considered to be the most practical and preferred embodiments, the foregoing description has been made only by way of illustration and example and is not to be interpreted as restrictive or limiting as to the meaning of words in the patent or its claims. It is understood that various modifications, variations, arrangements, and/or equivalents, can be devised without departing from the spirit and scope of the invention which is defined by the claims.

REFERENCE NUMBERS IN DRAWINGS

10 human game player
11 television (TV) set or video monitor
12 human game player
14 control switch
15 manual cross-shaped control switch
16 memory cartridge
19 video game system generally
20 joystick
22 LCD screen
23 touchscreen
26 process to stop reading disk
28 portable game system
33 LCD pictures
34 LCD pictures
35 generic virtual object
36 simulated hand & arm
37 simulated hand & arm 40 serial link port in portable system
41 wire from console to TV
42 video game system console
43 optical disk
44 portable game system
45 cable from controller to console
47 portable game system
50 processor in portable system
51 touchscreen controller
53 RAM in portable system
55 program process
56 video screen
59 cursor
60 program process
61 data bus connecting crypto processor
62 program process
63 program process
64 program process
65 program decision
66 program decision
67 program decision
68 program process
69 program process
70 program process
71 data bus connecting crypto processor
72 program decision
73 program decision
76 boot ROM in portable system
79 pressed authenticating data
80 burst cutting area (BCA) of disk
81 program and data area of disk
82 tracks molded into disk
83 optical disk reader
84 disk controller
86 microprocessor in console
87 serial port
88 UART
89 ROM in cartridge processor
90 SRAM in cartridge processor
91 boot ROM in cartridge processor
92 address bus
93 data bus
94 encrypted key (K1)
95 RSA "public" key
96 non-encrypted programs and/or data in RAM
97 encrypted programs and/or data
98 secret key (K2)
99 process of block decryption (K2)
100 secret key (K1)
101 disk serial number
103 input buffer
104 plain program(s) and/or data
105 output buffer
106 process of authenticating programs/data
107 process of RSA decryption
108 process of calculating hash values
109 key selection number
110 table of keys
111 process of block decrypting (K1)
112 hash value
113 key selection number
114 game product number
115 internal data bus
116 internal address bus
117 video signal generator
119 LCD driver
120 game server
121 the Internet
124 encrypted key (K1)
125 UART
126 crypto cartridge processor
128 cache memory in processor
129 process of block encryption (K2)
130 electric battery
131 secret key (K3)
133 process of block encryption (K1)
134 processor core in crypto chip
136 verify checksum using CRC
137 sending feature of modem
138 receiving feature of modem
142 process of block decryption (K2)
144 RSA encrypted ident signature
145 hash value
146 animated picture data
147 process of block encryption (K4)
148 lead-in encrypted key
149 disk molding machine
150 process of burning BCA into disk
151 console program in RAM
152 controller program in RAM
153 data flow from controller to console
154 data flow from console to controller
158 program process
159 program process
163 program process
164 program process
166 RSA private key
167 RSA encryption process
185 handheld controller
186 serial data link
200 program decision
201 program decision
202 program decision
203 program decision
204 program decision
205 program decision
209 program process
210 program process
211 program process
212 program process
213 program process
214 program process
230 insertion slot for cartridge
239 SRAM shared
247 multiple contact connector
279 multiple contact connector
287 crypto memory cartridge
289 bidirectional multiplexer
290 address multiplexer
293 address decoder
295 EEPROM or flash ROM
299 cartridge circuit board
300 direct memory access (DMA)
301 image coprocessor
302 video RAM
303 crypto processor
304 session key (K4)
305 authenticate disk digital & physical properties
306 process of block encryption (K3)
307 process of block decryption (K3)
308 table of game identifiers
309 count of number of software copies
310 thermal noise source
311 generate session key 313 boot ROM in crypto processor 303
314 process of block encryption (K5)

I claim:

1. A method of securely distributing computer executable instructions to multiple computers, comprising the steps of:
   (a) storing substantially unique identifying data in a secure single-chip cryptoprocessor that contains a processor core, writable data storage, decryption circuitry, and internal buses that are all inaccessible from said cryptoprocessor from locations outside of said cryptoprocessor chip, wherein said identifying data distinguishes different cryptoprocessor units;
   (b) transmitting said identifying data to a network server to enable download from said server of first and second programs of executable instructions, wherein said first program is encrypted in said server as a function of a randomly generated encryption key and said identifying data, such that said first program in encrypted form is downloaded to a first computer system that contains said cryptoprocessor during use, and wherein said second program is downloaded to said first computer system in unencrypted form;
   (c) decrypting said downloaded first program in said cryptoprocessor as a function of said identifying data and a decryption key to produce executable decrypted instructions in said writable data storage in said cryptoprocessor, wherein said decrypted instructions are inhibited from being output from said cryptoprocessor;
   (d) executing said decrypted instructions of said first program in said processor core in said cryptoprocessor to generate first output data; and
   (e) executing instructions of said second program in a second processor chip to process said first output data from said cryptoprocessor and to generate second output data that is processed as input data by said cryptoprocessor, such that said first program can be fully executed in said cryptoprocessor only by processing data in said cryptoprocessor that is generated by said second program and said second program can be fully executed only by processing data generated by said first program.

2. The method of claim 1, further comprising the steps of:
   encrypting said decryption key in said server to produce an encrypted key;
   transmitting said encrypted key from said server to said first computer; and
   decrypting said encrypted key in said cryptoprocessor to produce said decryption key in said cryptoprocessor to control decryption of said downloaded first program.

3. The method of claim 1, further comprising the steps of:
   storing a third encrypted program in said first computer system;
   transmitting said third encrypted program from said first computer system to a separately housed image processing system having a display device;
   decrypting and executing said third encrypted program in a second secure cryptoprocessor in said image processing system to generate picture data for display on said display device.

4. The method of claim 3, wherein said second secure cryptoprocessor is housed in a manually removable memory cartridge for use in said image processing system.

5. The method of claim 1, wherein said secure cryptoprocessor is housed in a manually removable memory cartridge that is electrically connected to said first computer system during said decrypting step.

6. The method of claim 1, wherein said first computer system is a video game console system and said first and second programs are game programs.

7. The method of claim 1, wherein said identifying data is stored in non-volatile writable memory in said secure cryptoprocessor.

8. The method of claim 1, further comprising the steps of:
   reading an unencrypted third program of executable instructions from an optically coded disk into said first computer system; and
   executing instructions of said third program in a processor in said first computer system to process said output data from said cryptoprocessor and to generate third data that is processed by said cryptoprocessor.

9. The method of claim 1, wherein said encryption key and said decryption key are the same symmetrical session key.

10. A method of securely distributing computer executable instructions to multiple computers, comprising the steps of:
    (a) storing substantially unique identifying data in a secure single-chip cryptoprocessor that contains a processor core, writable data storage, decryption circuitry, and internal buses that are all inaccessible from said cryptoprocessor from locations outside of said cryptoprocessor chip, wherein said identifying data distinguishes different cryptoprocessor units;
    (b) transmitting said identifying data to a network server to enable download from said server of first and second programs of executable instructions, wherein said first program is encrypted in said server as a function of a randomly generated encryption key, said encryption key being further encrypted as a function of said identifying data to produce an encrypted key, such that said first program in encrypted form and said encrypted key are downloaded to a first computer system that contains said cryptoprocessor during use, and wherein said second program is downloaded to said first computer system in unencrypted form;
    (c) decrypting said downloaded first program in said cryptoprocessor as a function of said identifying data and a decryption key to produce executable decrypted instructions in said writable data storage in said cryptoprocessor, wherein said decrypted instructions are inhibited from being output from said cryptoprocessor;
    (d) executing said decrypted instructions of said first program in said processor core in said cryptoprocessor to generate first output data; and
    (e) executing instructions of said second program in a second processor chip to process said first output data from said cryptoprocessor and to generate second output data that is processed as input data by said cryptoprocessor, such that said first program can be fully executed in said cryptoprocessor only by processing data in said cryptoprocessor that is generated by said second program and said second program can be fully executed only by processing data generated by said first program.

11. The method of claim 10, further comprising the steps of:
    reading an unencrypted third program of executable instructions from an optically coded disk into said first computer system; and
    executing instructions of said third program in a second processor in said first computer system to process said output data from said cryptoprocessor and to generate third data that is processed by said cryptoprocessor.

12. The method of claim 10, wherein said identifying data is stored in non-volatile writable memory in said secure cryptoprocessor.

13. The method of claim 10, wherein said cryptoprocessor is housed in a manually removable housing and is electrically connected to said first computer system during said decrypting steps.

14. A computer-readable data storage medium having stored thereon data comprising:
   (a) an encrypted first program of instructions for execution in a secure single-chip cryptoprocessor in a first computer;
   (b) an unencrypted second program of instructions for execution in a second processor chip in said first computer; and
   (c) an encrypted digital key for controlling decryption of said encrypted first program in said secure cryptoprocessor;
   (d) wherein said cryptoprocessor contains a processor core, writable data storage, decryption circuitry, internal buses that are all inaccessible from said cryptoprocessor from locations outside of said cryptoprocessor chip, and non-volatile data memory storing substantially unique identifying data that distinguishes different cryptoprocessor units;
   (e) such that said identifying data is transmitted to a network server to control encryption and to enable download from said server of said first and second programs of executable instructions, wherein said first program is encrypted in said server as a function of said digital key that is randomly generated in said server;
   (f) such that said cryptoprocessor decrypts said downloaded first program as a function of said identifying data and said digital key to produce executable decrypted instructions in said writable data storage in said cryptoprocessor, wherein said decrypted instructions are inhibited from being output from said cryptoprocessor;
   (g) wherein said decrypted instructions of said first program are executed in said processor core in said cryptoprocessor to generate first output data;
   (h) such that said instructions of said second program are executed in said second processor to process said first output data from said cryptoprocessor and to generate second output data that is processed as input data by said cryptoprocessor, such that said first program can be fully executed in said cryptoprocessor only by processing data in said cryptoprocessor that is generated by said second program and said second program can be fully executed only by processing data generated by said first program.

15. The data storage medium of claim 14, wherein said first program is encrypted in said server as a function of said identification data and said digital key.

16. The data storage medium of claim 14, wherein said digital key is encrypted in said server as a function of said identification data and an encryption key.

17. The data storage medium of claim 14, wherein said data storage medium is housed in a manually removable memory cartridge that is electrically connected to said first computer during said decrypting.

18. The data storage medium of claim 14, wherein said data storage medium is electrically connected to said first computer during use.

19. The data storage medium of claim 14, wherein said data storage medium is wirelessly linked to said first computer during use.

20. The data storage medium of claim 14, wherein said first computer is a video game console system and said first program is a game program.

* * * * *